(12) United States Patent
Ren et al.

(10) Patent No.: US 12,727,022 B2
(45) Date of Patent: Sep. 1, 2026

(54) LAYER 1 CROSS-LINK INTERFERENCE COLLISION MANAGEMENT

(71) Applicant: QUALCOMM Incorporated, San Diego, CA (US)

(72) Inventors: Yuwei Ren, Beijing (CN); Yan Zhou, San Diego, CA (US); Huilin Xu, Temecula, CA (US); Qian Zhang, Basking Ridge, NJ (US); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 18/710,592

(22) PCT Filed: Jan. 20, 2022

(86) PCT No.: PCT/CN2022/072889

§ 371 (c)(1),
(2) Date: May 15, 2024

(87) PCT Pub. No.: WO2023/137653

PCT Pub. Date: Jul. 27, 2023

(65) Prior Publication Data

US 2025/0016819 A1 Jan. 9, 2025

(51) Int. Cl.
*H04W 72/566* (2023.01)
*H04W 24/08* (2009.01)
*H04W 72/1273* (2023.01)

(52) U.S. Cl.
CPC ......... *H04W 72/566* (2023.01); *H04W 24/08* (2013.01); *H04W 72/1273* (2013.01)

(58) Field of Classification Search
CPC ...... H04L 41/145; H04L 43/00; H04W 16/18; H04W 24/08; H04W 28/08; H04W 72/04;
(Continued)

(56) References Cited

U.S. PATENT DOCUMENTS 11,968,555 B2 * 4/2024 Lee ........................ H04W 24/10
2020/0229009 A1 7/2020 Xu et al.
(Continued)

FOREIGN PATENT DOCUMENTS

CN 113366878 9/2021
WO WO-2020146830 7/2020
(Continued)

OTHER PUBLICATIONS

Huawei et al., "Discussion on Accuracy Requirements for CLI Measurements", 3GPPTSG-RAN WG4 Meeting #94-e, R4-2001621, 3rd Generation Partnership Project (3GPP), Mobile Competence Centre, 650, Route Des Lucioles, F-06921 Sophia-Antipolis Cedex, France, vol. RAN WG4, No. Online, Feb. 24-Mar. 6, 2020, Feb. 14, 2020, XP051851512, paragraph 2.3.
(Continued)

*Primary Examiner* — Thomas R Cairns
(74) *Attorney, Agent, or Firm* — Holland & Hart LLP

(57) ABSTRACT

Methods, systems, and devices for wireless communications are described. Generally, the described techniques provide for prioritization schemes for prioritizing colliding cross-link interference (CLI) measurements scheduled via Layer-1 signaling and a downlink transmissions scheduled according to periodic configurations. In some examples, a user equipment (UE) may prioritize downlink transmissions over CLI measurements. A UE may not monitor for or may not decode downlink control information scheduling CLI measurements in resources that the UE has a scheduled downlink reception according to a periodic scheduling configuration. In some examples, the UE may prioritize a colliding CLI measurement and downlink transmission based on an indicated priority of each, a type a CLI measurement, a type of downlink transmission, and/or a location of the UE within the cell. The UE may either monitor for the downlink transmission or perform the CLI measurement based on the priority scheme.

30 Claims, 12 Drawing Sheets

(58) Field of Classification Search
CPC ............. H04W 72/11; H04W 72/1273; H04W 72/23–232; H04W 72/56; H04W 72/566
See application file for complete search history.

(56) References Cited

U.S. PATENT DOCUMENTS

| | | | | |
|---|---|---|---|---|
| 2020/0266908 | A1* | 8/2020 | Qian | H04L 5/0094 |
| 2021/0289374 | A1 | 9/2021 | Zhang et al. | |
| 2024/0237047 | A1* | 7/2024 | Kazmi | H04L 47/623 |

FOREIGN PATENT DOCUMENTS

| | | | |
|---|---|---|---|
| WO | WO-2020198056 | A1 | 10/2020 |
| WO | WO-2020252339 | A1 | 12/2020 |
| WO | WO-2021203410 | A1 | 10/2021 |
| WO | WO-2021253150 | A1 | 12/2021 |

OTHER PUBLICATIONS

Intel Corporation: "UE Features in CLI/RIM", 3GPP TSG RAN WG1 #100b-e, R1-2002686, Apr. 20-30, 2020, E-Meeting, Apr. 30, 2020, 3 Pages. The Whole Document, section 2.

International Search Report and Written Opinion—PCT/CN2022/072889—ISA/EPO—Oct. 10, 2022 (2201192WO1).

* cited by examiner

LAYER 1 CROSS-LINK INTERFERENCE COLLISION MANAGEMENT

CROSS REFERENCE

The present application is a 371 national phase filing of International PCT Application No. PCT/CN2022/072889 by REN et al., entitled "LAYER 1 CROSS-LINK INTERFERENCE COLLISION MANAGEMENT," filed Jan. 20, 2022, which is assigned to the assignee hereof, and which is expressly incorporated by reference in its entirety herein.

FIELD OF TECHNOLOGY

The following relates to wireless communications, including Layer-1 cross-link interference collision management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support Layer-1 cross-link interference (CLI) collision management. Generally, the described techniques provide for prioritization schemes for prioritizing colliding CLI measurements scheduled via Layer-1 signaling (e.g., downlink control information (DCI) signaling) and downlink transmissions scheduled according to periodic scheduling configurations. A user equipment (UE) may receive, from a base station, control signaling (e.g., DCI signaling, radio resource control (RRC) signaling, other control signaling) scheduling a set of downlink transmissions according to a periodic scheduling configuration. The UE may also receive, from the base station, DCI scheduling a CLI measurement in a communications resource. The UE may monitor for a downlink transmission of the set of downlink transmissions or perform the CLI measurement using the communications resource based on a priority scheme associated with the CLI measurement and a collision between the CLI measurement and the downlink transmission.

In some examples, the UE may prioritize downlink transmissions over CLI measurements. Accordingly, in some examples a UE may not monitor for or may not decode DCI scheduling a CLI measurement in resources that the UE has a scheduled downlink reception. In some examples, the base station may indicate a priority level associated with the downlink transmissions scheduled according to the periodic scheduling configuration, and the base station may indicate a priority level associated with a particular CLI measurement. For example, a base station may indicate a higher priority level associated with a scheduled CLI measurement associated with a particular aggressor UE (e.g., based on past behavior of the aggressor UE or the location of the aggressor UE in relation to the victim UE). In some examples, the UE may prioritize particular types of downlink transmissions over CLI measurements (e.g., physical downlink control channel (PDCCH) or channel state information (CSI) reference signals (CSI-RS)). In some examples, the UE may prioritize some types of CLI measurements over downlink transmissions and the UE may prioritize some types of CLI measurements below downlink transmissions. For example, the UE may prioritize sounding reference signal (SRS) received signal received power (RSRP) measurements above downlink transmissions and the UE may prioritize CLI received signal strength indicator (RSSI) measurements below downlink transmissions. In some examples, the base station may indicate whether the CLI measurement will be used to measure intra-cell or inter-cell CLI, and the UE may prioritize the CLI measurement based on the location of the UE and the indication of whether the CLI measurement is for intra-cell or inter-cell CLI. For example, a UE on the edge of a cell may assign a higher priority to an inter-cell CLI measurement, while a UE in the center of a cell may assign a higher priority to an intra-cell CLI measurement.

A method for wireless communications at a user equipment (UE) is described. The method may include receiving, from a base station, control signaling scheduling a set of downlink transmissions according to a periodic scheduling configuration, receiving, from the base station, downlink control information scheduling a cross-link interference measurement in a communications resource, and monitoring for a downlink transmission of the set of downlink transmissions or performing the cross-link interference measurement using the communications resource based on a priority scheme associated with cross-link interference measurement and a collision between the downlink transmission and the communications resource.

An apparatus for wireless communications at a UE is described. The apparatus may include a processor, memory coupled with the processor, and instructions stored in the memory. The instructions may be executable by the processor to cause the apparatus to receive, from a base station, control signaling scheduling a set of downlink transmissions according to a periodic scheduling configuration, receive, from the base station, downlink control information scheduling a cross-link interference measurement in a communications resource, and monitor for a downlink transmission of the set of downlink transmissions or performing the cross-link interference measurement using the communications resource based on a priority scheme associated with cross-link interference measurement and a collision between the downlink transmission and the communications resource.

Another apparatus for wireless communications at a UE is described. The apparatus may include means for receiving, from a base station, control signaling scheduling a set of downlink transmissions according to a periodic scheduling configuration, means for receiving, from the base station, downlink control information scheduling a cross-link interference measurement in a communications resource, and means for monitoring for a downlink transmission of the set of downlink transmissions or performing the cross-link interference measurement using the communications resource based on a priority scheme associated with cross-link interference measurement and a collision between the downlink transmission and the communications resource.

A non-transitory computer-readable medium storing code for wireless communications at a UE is described. The code may include instructions executable by a processor to receive, from a base station, control signaling scheduling a set of downlink transmissions according to a periodic scheduling configuration, receive, from the base station, downlink control information scheduling a cross-link interference measurement in a communications resource, and monitor for a downlink transmission of the set of downlink transmissions or performing the cross-link interference measurement using the communications resource based on a priority scheme associated with cross-link interference measurement and a collision between the downlink transmission and the communications resource.

Some examples of the method, apparatuses, and non-transitory computer-readable medium described herein may further include operations, features, means, or instructions for receiving, from the base station, an indication of the priority scheme.

Some examples of the method, apparatuses, and non-transitory computer-readable medium described herein may further include operations, features, means, or instructions for receiving the downlink control information scheduling the cross-link interference measurement in accordance with a periodic scheduling cross-link interference measurement configuration and monitoring for the downlink transmission using the communications resource based on the priority scheme assigning a higher priority level to downlink transmissions than to cross-link interference measurements scheduled in accordance with periodic scheduling cross-link interference measurement configurations.

Some examples of the method, apparatuses, and non-transitory computer-readable medium described herein may further include operations, features, means, or instructions for performing the cross-link interference measurement using the communications resource based on the cross-link interference measurement including an aperiodic cross-link measurement and the priority scheme assigning a higher priority level to aperiodic cross-link measurements than to downlink transmissions.

Some examples of the method, apparatuses, and non-transitory computer-readable medium described herein may further include operations, features, means, or instructions for monitoring for the downlink transmission using the communications resource based on the downlink transmission including a downlink control channel transmission and the priority scheme assigning a higher priority level to downlink control channel transmissions than to cross-link interference measurements.

Some examples of the method, apparatuses, and non-transitory computer-readable medium described herein may further include operations, features, means, or instructions for monitoring for the downlink transmission using the communications resource based on the downlink transmission including a channel state information reference signal and the priority scheme assigning a higher priority level to channel state information reference signals than to cross-link interference measurements.

Some examples of the method, apparatuses, and non-transitory computer-readable medium described herein may further include operations, features, means, or instructions for suppressing decoding of the downlink control information based on determining that the downlink control information may be associated with the communications resource as the downlink transmission and based on the priority scheme assigning a higher priority level to downlink transmissions than to cross-link interference measurements.

Some examples of the method, apparatuses, and non-transitory computer-readable medium described herein may further include operations, features, means, or instructions for receiving, from the base station, an indication that the cross-link interference measurement includes a sounding reference signal reference signal received power measurement and performing the cross-link interference measurement using the communications resource based on the priority scheme assigning a higher priority level to sounding reference signal reference signal received power measurements than to downlink transmissions.

Some examples of the method, apparatuses, and non-transitory computer-readable medium described herein may further include operations, features, means, or instructions for identifying an aggressor UE based on the sounding reference signal reference signal received power measurement and reporting the cross-link interference measurement and the aggressor UE to the base station.

Some examples of the method, apparatuses, and non-transitory computer-readable medium described herein may further include operations, features, means, or instructions for receiving, from the base station, an indication that the cross-link interference measurement includes a cross-link interference received signal strength indicator measurement and monitoring for the downlink transmission using the communications resource based on the priority scheme assigning a higher priority level to downlink transmissions than to cross-link interference received signal strength indicator measurements.

Some examples of the method, apparatuses, and non-transitory computer-readable medium described herein may further include operations, features, means, or instructions for receiving, from the base station, an indication of a first priority level associated with the cross-link interference measurement and monitoring for the downlink transmission or performing the cross-link interference measurement using the communications resource based on a comparison of the first priority level to a second priority level associated with the downlink transmission.

Some examples of the method, apparatuses, and non-transitory computer-readable medium described herein may further include operations, features, means, or instructions for receiving, with the control signaling, an indication of the second priority level associated with the downlink transmission.

Some examples of the method, apparatuses, and non-transitory computer-readable medium described herein may further include operations, features, means, or instructions for receiving the indication of the first priority level associated with the cross-link interference measurement via one of the downlink control information, a radio resource control message, or a medium access control (MAC) control element.

Some examples of the method, apparatuses, and non-transitory computer-readable medium described herein may further include operations, features, means, or instructions for receiving, from the base station, an indication that the cross-link interference measurement may be associated with either inter-cell or intra-cell cross-link interference, determining a position of the UE within a cell associated with the base station, and monitoring for the downlink transmission or performing the cross-link interference measurement based on the indication and the determined position of the UE within the cell.

Some examples of the method, apparatuses, and non-transitory computer-readable medium described herein may further include operations, features, means, or instructions for receiving the indication that the cross-link interference measurement may be associated with either inter-cell or intra-cell cross-link interference via one of the downlink control information, a radio resource control message, or a medium access control (MAC) control element.

BRIEF DESCRIPTION OF THE DRAWINGS

FIGS. 3*a* through 3*c* illustrate examples of a timing diagrams that supports Layer-1 cross-link interference collision management in accordance with aspects of the present disclosure.

DETAILED DESCRIPTION

Figure 1:
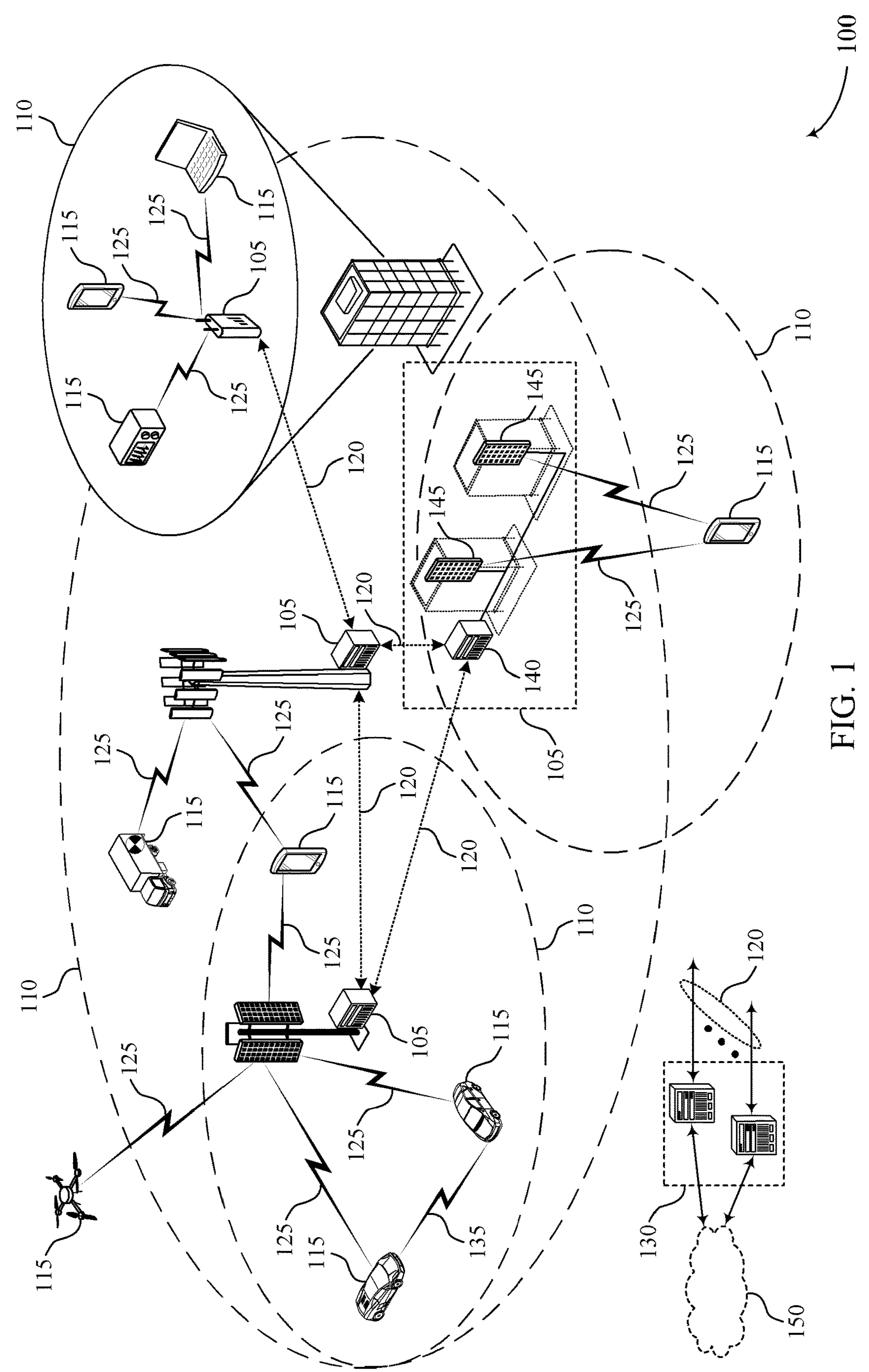
FIG. 1 illustrates an example of a wireless communications system that supports Layer-1 cross-link interference collision management in accordance with aspects of the present disclosure.

A user equipment (UE) may experience cross-link interference (CLI) attributable to signals transmitted by other UEs. For example, a "victim" UE may experience CLI from signals transmitted by an "aggressor" UE in cases where downlink resources of the victim UE overlap with uplink resources of the aggressor UE, thereby resulting in CLI. In some wireless communications systems, UEs may be configured to perform CLI measurements on signals received from other UEs, and report measured CLI to the network so that the network may adjust resources allocated to the respective UEs to reduce CLI. In some cases, base stations may coordinate resources for CLI measurements using Layer-3 (e.g., via Radio Resource Control (RRC)) signaling. Layer-3 signaling, however, may be unable to account for dynamic CLI caused by dynamic time division duplexing slot configurations. For example, Layer-3 signaling may be insufficient to measure CLI caused by intra-cell CLI. Accordingly, a base station may configure CLI measurement resources using Layer-1 signaling (e.g., via downlink control information (DCI) signaling). CLI measurement resources configured via Layer-1 signaling, however, may collide with downlink transmissions (e.g., serving signals) scheduled according to periodic or semi-persistent scheduling (SPS) configurations (collectively referred to as periodic scheduling configurations).

Aspects of the disclosure relate to prioritization schemes for prioritizing CLI measurements scheduled via Layer-1 signaling and downlink transmissions scheduled according to periodic scheduling configurations. A UE may receive, from a base station, control signaling scheduling a set of downlink transmissions according to a periodic scheduling configuration. The UE may also receive, from the base station, DCI scheduling a CLI measurement in a communications resource. The UE may monitor for a downlink transmission of the set of downlink transmissions or perform the CLI measurement using the communications resource based on a priority scheme associated with the CLI measurement and a collision between the communications resource and the downlink transmission.

In some examples, a UE may prioritize downlink transmissions over CLI measurements. Accordingly, in some examples a UE may not monitor for or may not decode DCI scheduling CLI measurements in resources that the UE has a scheduled downlink reception. In some examples, the base station may indicate a priority level associated with the downlink transmissions scheduled according to the periodic scheduling configurations, and the base station may indicate a priority level associated with a particular CLI measurement. For example, a base station may indicate a higher priority level associated with a scheduled CLI measurement associated with a particular aggressor UE (e.g., based on past behavior of the aggressor UE or the location of the aggressor UE in relation to the victim UE). In some examples, the UE may prioritize particular types of downlink transmissions over CLI measurements (e.g., physical downlink control channel (PDCCH) or channel state information (CSI) reference signals (CSI-RS)). In some examples, the UE may prioritize some types of CLI measurements over downlink transmissions and the UE may prioritize some types of CLI measurements below downlink transmissions. For example, the UE may prioritize sounding reference signal (SRS) received signal received power (RSRP) CLI measurements above downlink transmissions and the UE may prioritize CLI received signal strength indicator (RSSI) measurements below downlink transmissions. In some examples, the base station may indicate whether the CLI measurement will be used to measure intra-cell or inter-cell CLI, and the UE may prioritize the CLI measurement based on the location of the UE and the indication of whether the CLI measurement is for intra-cell or inter-cell CLI. For example, a UE on the edge of a cell may assign a higher priority to an inter-cell CLI measurement, while a UE in the center of a cell may assign a higher priority to an intra-cell CLI measurement.

Aspects of the disclosure are initially described in the context of wireless communications systems. Aspects of the disclosure are initially described in the context of timing diagrams and process flows. Aspects of the disclosure are further illustrated by and described with reference to apparatus diagrams, system diagrams, and flowcharts that relate to Layer-1 cross-link interference collision management.

FIG. 1 illustrates an example of a wireless communications system 100 that supports Layer-1 cross-link interference collision management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels. Signaling at the physical layer may be an example of Layer-1 signaling, while signaling at the MAC layer may be an example of Layer-2 signaling, and signaling at the RRC protocol layer may be an example of Layer-3 signaling.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may experience CLI attributable to signals transmitted by other UEs 115. For example, when an aggressor UE 115 is transmitting a victim UE 115 may receive the transmission as CLI in the downlink symbols of the victim UE 115 if the uplink symbols of the aggressor UE 115 collide with at least one downlink symbol of the victim UE 115. CLI may occur between two UEs in the same cell (intra-cell CLI) or between UEs 115 in different cells (inter-cell CLI). UEs 115 may be configured to perform CLI measurements on signals received from other UEs 115, and report measured CLI to the network (e.g., to a serving base station 105) so that the network may adjust resources allocated to the respective UEs 115 to reduce CLI.

In some cases, base stations 105 may coordinate resources for CLI measurements using Layer-3 (e.g., RRC) signaling. In some examples, the aggressor UE 115 may not transmit signals dedicated for CLI measurement, and the aggressor UE 115 may not be notified that the transmissions of the aggressor UE 115 may be measured for the victim UE 115. In some examples, a victim UE 115 may measure CLI if the network configures one or more CLI measurement resource for the victim UE 115. In some examples, the base station 105 may configure a periodic CLI measurement based on SRS RSRP or RSSI using Layer-3 signaling. CLI measurements configured via Layer-3 signaling may be configured to be measured and reported according to a periodic pattern. In some cases, a downlink transmission transmitted by the serving base station 105 of the victim UE 115 may collide with a CLI measurement scheduled according to the periodic pattern via Layer-3 signaling. If a CLI measurement scheduled according to the periodic pattern via Layer-3 signaling (e.g., a Layer-3 scheduled CLI measurement) and a downlink transmission collide, the UE 115 may be unable to both monitor for the downlink transmission (and accordingly receive the downlink transmission) because the CLI measurement and the downlink transmission may be associated with different timing receptions and the UE 115 may be unable to use a single Fast Fourier Transform (FFT) window to receive both signals (e.g., the downlink transmission from the base station 105 and the transmission from the aggressor UE 115). For example, a downlink transmission may be associated with a first timing offset and a CLI measurement may be associated with a different timing offset.

In some examples, a UE 115 may prioritize a Layer-3 scheduled CLI measurement over a downlink transmission (e.g., a physical downlink shared channel (PDSCH) transmission, a PDCCH transmission, or a CSI-RS) if a collision occurs. Accordingly, the UE 115 may monitor for and receive a transmission from an aggressor UE to measure the CLI caused by the transmission and may not receive the downlink transmission. Prioritizing a downlink transmission (e.g., a PDSCH transmission, PDCCH transmission, or a CSI-RS) may entail a tight timeline in order for the UE 115 to decode a dynamic grant scheduling the downlink transmission, check whether a collision occurs with the Layer-3 scheduled CLI measurement, and switch FFT windows in order to monitor for and receive the downlink transmission. To prioritize the Layer-3 scheduled CLI measurement, the UE 115 may maintain the scheduled timing according to the configured periodic pattern to monitor for and receive the signal from the aggressor UE to measure the CLI. Always prioritizing the Layer-3 scheduled CLI measurement over the downlink transmission may lead to resource waste, for example if CLI does not actually exist (e.g., unless the base station 105 knows there is a high probability that CLI exists at the victim UE 115). Downlink transmissions may be frequently skipped if Layer-3 scheduled CLI measurements are prioritized and may not be timely received, especially in cases of dense periodic pattern CLI measurements. In some examples where the Layer-3 scheduled CLI measurements are prioritized, a victim UE 115 may assume the receive timing for the CLI measurement for communications resources in which a Layer-3 scheduled CLI measurement is scheduled. In such examples, even if there is no CLI (e.g., no CLI from aggressor UEs), a colliding downlink transmission may not be received by the UE 115.

Layer-3 scheduled CLI measurements may mainly measure inter-cell CLI caused by semi-static time division duplexing configuration differences between different cells. Layer-3 scheduled CLI measurements may be unable to account for dynamic CLI caused by dynamic time division duplexing slot configurations. For example, Layer-3 signaling may be insufficient to measure CLI caused by intra-cell CLI. For example, if configured with a sparse periodic pattern, Layer-3 scheduled CLI measurements may not estimate the CLI caused by more dynamic interference and may be involve a large latency (e.g., a large time between CLI measurements). For example, a sparse Layer-3 scheduled period CLI measurement pattern may miss measuring actual CLI. A dense Layer-3 scheduled CLI measurement periodic pattern may be associated with high resource overhead and operation cost. For flexible duplexing based on dynamic time division duplexing, Layer-3 scheduled CLI measurements may be unable to dynamically estimate the CLI.

Accordingly, a base station 105 may configure CLI measurement resources using Layer-1 signaling (e.g., DCI signaling). For example, NR communications may operate in a TDD only mode in mmW. Dynamic TDD, such as the TDD only mode in mmW, may be a powerful option to provide high throughput communication with asymmetric communication. In flexible duplexing, such as dynamic TDD, a periodical interference pattern may not exist. Layer-1 configured CLI measurements may enable a UE 115 to collect and report CLI measurements dynamically, enabling the base station 105 to quickly react to and account for CLI when scheduling communications. Accordingly, Layer-3 scheduled periodic CLI measurements may not be as useful as dynamically scheduled CLI measurements (e.g., CLI measurements configured via Layer-1 signaling).

Layer-1 configured CLI measurements may be measured and reported periodically, according to an SPS configuration, or aperiodically. CLI measurement resources configured via Layer-1 signaling may collide with downlink transmissions (e.g., downlink transmissions scheduled according to periodic scheduling configurations). For example, a base station 105 may be unable to avoid a collision between a Layer-1 configured CLI measurement and an SPS PDSCH, an SPS CSI-RS, a periodic CSI-RS, or a PDCCH (which may be periodic based on an RRC search space set configuration). The base station 105 may be unable to avoid such collisions if the base station 105 supports dynamic time division duplexing (e.g., full duplex at the base station 105) because there may be one uplink symbol for an aggressor UE 115 scheduled in the same symbol as a downlink symbol for a victim UE 115. If the victim UE 115's downlink transmissions are periodically or SPS configured, the base station 105 may be unable to guarantee that the aggressor UE 115's uplink symbol never collides with the periodic downlink symbols of the victim UE 115 unless scheduling flexibility is limited, which may diminish the throughput benefit of dynamic time division duplexing.

Priority schemes may be configured at a UE 115 to account for collisions between downlink transmissions and Layer-1 configured CLI measurements. A UE 115 may receive, from a base station 105, control signaling scheduling a set of downlink transmissions according to a periodic scheduling configuration. The UE 115 may also receive, from the base station 105, DCI scheduling a CLI measurement in a communications resource. The UE 115 may monitor for a downlink transmission of the set of downlink transmissions or perform the CLI measurement using the communications resource based on a priority scheme associated with the CLI measurement and a collision between the CLI measurement and the downlink transmission.

In some examples, a UE 115 may prioritize downlink transmissions over CLI measurements. Accordingly, in some examples a UE 115 may not monitor for or may not decode DCI scheduling CLI measurements in resources that the UE 115 has a scheduled downlink reception. Downlink transmissions may be prioritized because prioritizing Layer-1 configured CLI measurements may be challenging for the UE 115. For example, because the determination prioritizing the periodically scheduled downlink transmissions may not be determined dynamically, processing the periodically scheduled downlink transmissions may be easier for the UE 115 to process than the CLI measurement. Further, some downlink transmissions may be more important for the UE 115 than the CLI measurement (e.g., control signals or some reference signals).

In some examples, the base station 105 may indicate a priority level associated with the downlink transmissions scheduled according to the periodic scheduling configurations, and the base station 105 may indicate a priority level associated with a particular CLI measurement. For example, a base station 105 may indicate a higher priority level associated with a scheduled CLI measurement associated with a particular aggressor UE 115 (e.g., based on past behavior of the aggressor UE 115 or the location of the aggressor UE 115 in relation to the victim UE 115). In some examples, the UE 115 may prioritize particular types of downlink transmissions over CLI measurements (e.g., PDCCH or CSI-RS). In some examples, the UE 115 may prioritize some types of CLI measurements over downlink transmissions and the UE 115 may prioritize some types of CLI measurements below downlink transmissions. For example, the UE 115 may prioritize SRS RSRP measurements above downlink transmissions and the UE 115 may prioritize CLI RSSI measurements below downlink transmissions. In some examples, the base station 105 may indicate whether the CLI measurement will be used to measure intra-cell or inter-cell CLI, and the UE 115 may prioritize the CLI measurement based on the location of the UE 115 and the indication of whether the CLI measurement is for intra-cell or inter-cell CLI. For example, a UE 115 on the edge of a cell may assign a higher priority to an inter-cell CLI measurement, while a UE 115 in the center of a cell may assign a higher priority to an intra-cell CLI measurement.

Figure 2:
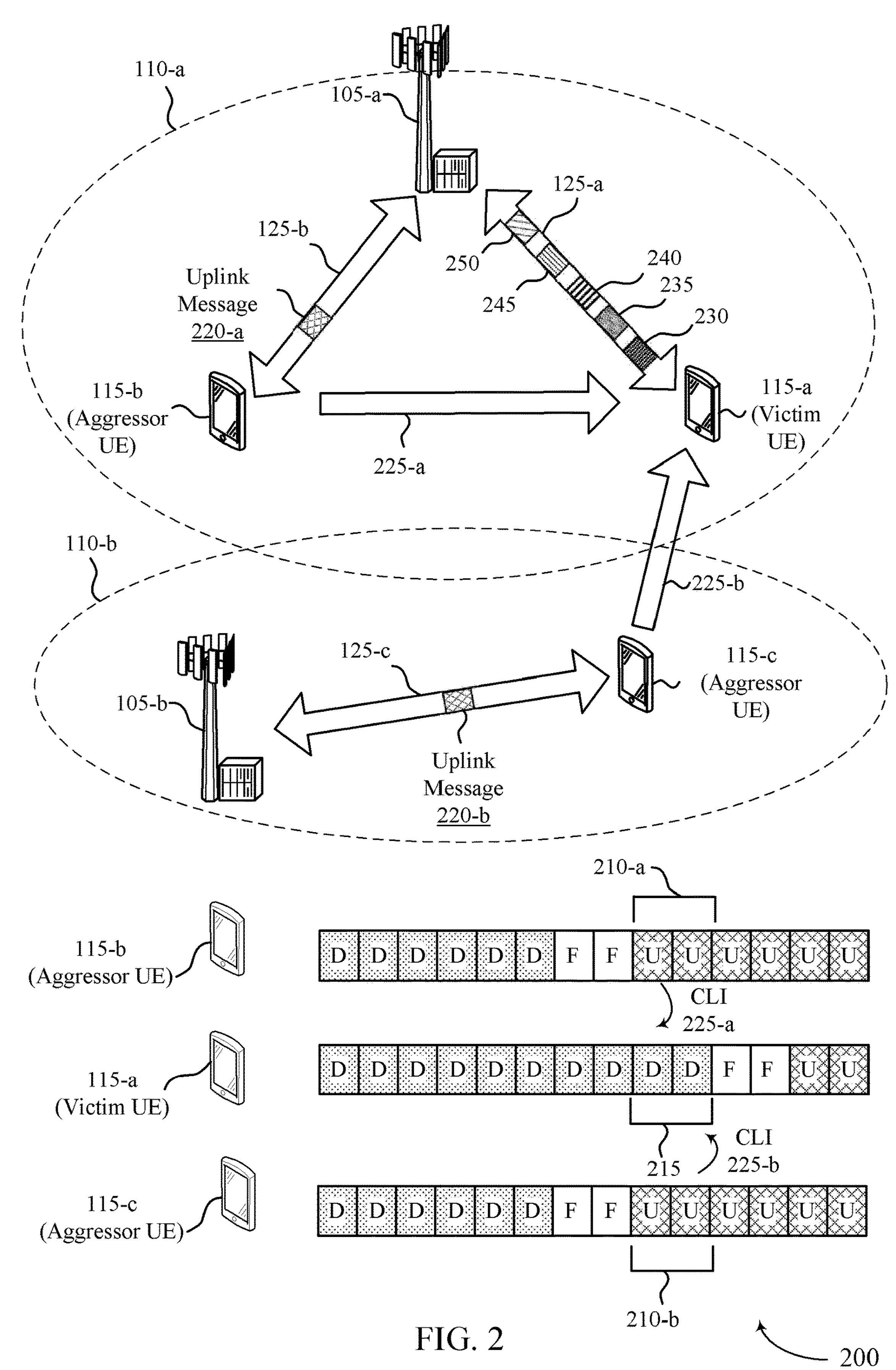
FIG. 2 illustrates an example of a wireless communications system that supports Layer-1 cross-link interference collision management in accordance with aspects of the present disclosure.

FIG. 2 illustrates an example of a wireless communications system 200 that supports Layer-1 cross-link interference collision management in accordance with aspects of the present disclosure. In some examples, the wireless communications system 200 may implement aspects of wireless communications system 100. The wireless communications system 200 may include UEs 115-*a*, 115-*b*, and 115-*c* which may be examples of UEs 115 as described herein. The wireless communications system 200 may include base stations 105-*a* and 105-*b*, which may be examples of base stations 105 as described herein.

The UE 115-*a* and the UE 115-*b* may be located within the geographic coverage area 110-*a* of the base station 105-*a* and may communicate with the base station 105-*a* using a communication link 125-*a* and a communication link 125-*b*, respectively, which may be examples of NR or LTE links between the UE 115-*a* or the UE 115-*b*, respectively, and the base station 105-*a*. The UE 115-*c* may be located within the geographic coverage area 110-*b* of the base station 105-*b* and may communicate with the base station 105-*b* using a communication link 125-*c*, which may be an example of an NR or LTE link between the UE 115-*c* and the base station 105-*b*. The communication link 125-*a*, the communication link 125-*b*, and the communication link 125-*c* may include bi-directional links that enable both uplink and downlink communication. For example, the UE 115-*a* may transmit uplink signals, such as uplink control signals or uplink data signals, to the base station 105-*a* using the communication link 125-*a* and the base station 105-*a* may transmit downlink transmissions, such as downlink control signals or downlink data signals, to the UE 115-*a* using the communication link 125-*a*. By way of another example, the UE 115-*b* may transmit uplink signals, such as uplink control signals or uplink data signals, to the base station 105-*a* using the communication link 125-*b* and the base station 105-*a* may transmit downlink transmissions, such as downlink control signals or downlink data signals, to the UE 115-*b* using the communication link 125-*b*. By way of another example, the UE 115-*c* may transmit uplink signals, such as uplink control signals or uplink data signals, to the base station 105-*b* using the communication link 125-*c* and the base station 105-*b* may transmit downlink transmissions, such as downlink control signals or downlink data signals, to the UE 115-*c* using the communication link 125-*c*.

In some examples, the UE 115-*a* (e.g., the victim UE) may experience intra-cell CLI 225-*a* when receiving downlink transmissions from the base station 105-*a* via the communication link 125-*a* from uplink signals transmitted by the UE 115-*b* via the communication link 125-*b* if the uplink signals and downlink transmissions overlap (e.g., if the uplink and downlink transmissions have overlapping symbols).

In some examples, the UE 115-*a* may experience inter-cell CLI 225-*b* when receiving downlink transmissions from the base station 105-*a* via the communication link 125-*a* from uplink signals transmitted by the UE 115-*c* via the communication link 125-*c* if the uplink signals and downlink transmissions overlap (e.g., if the uplink and downlink transmissions have overlapping symbols).

CLI may occur when the network (e.g., base station 105-*a* and base station 105-*b*) configures multiple nearby UEs 115 with different TDD uplink and downlink slot formats. In particular, when an aggressor UE 115 (e.g., UE 115-*b* or UE 115-*c*) is transmitting uplink signals 220, a nearby victim UE 115 (e.g., UE 115-*a*) may receive the uplink signals 220 as CLI within its configured downlink symbols if uplink symbols of the aggressor UE 115-*b* or 115-*c* collide with (e.g., overlap with) at least one downlink symbol of the victim UE 115-*a*. The uplink signals 220 transmitted by the aggressor UE 115-*b* or the aggressor UE 115-*c* may or may not be intended for the victim UE 115-*a*, such that the victim UE 115-*a* inadvertently "intercepts" the uplink signals 220 intended for another wireless device (e.g., base station 105-*a* or base station 105-*b*).

For example, as shown in FIG. 2, the UE 115-*a* (e.g., victim UE 115-*a*) may experience CLI 225-*a* from uplink signals 220-*a* transmitted by the UE 115-*b* in cases where downlink resources 215 of the UE 115-*a* overlap with uplink resources 210-*a* of the UE 115-*b* (e.g., where an uplink symbol from the aggressor UE 115-*b* collides with a downlink symbol of the victim UE 115-*a*). In such cases, uplink signals 220-*a* from UE 115-*b* over the uplink resources 210-*a* may collide with, or otherwise interrupt or interfere with, downlink transmissions received by the UE 115-*a* within the downlink resources 215, thereby resulting in CLI 225-*a*. Similarly, the UE 115-*a* may experience CLI 225-*b* from uplink signals 220-*b* transmitted by the UE 115-*c* in cases where downlink resources 215 of the UE 115-*a* overlap with uplink resources 210-*b* of the UE 115-*c* (e.g., where an uplink symbol from the aggressor UE 115-*c* collides with a downlink symbol of the victim UE 115-*a*). In such cases, uplink signals 220-*b* from UE 115-*c* over the uplink resources 210-*b* may collide with, or otherwise interrupt or interfere with, downlink transmissions received by the UE 115-*a* within the downlink resources 215, thereby resulting in CLI 225-*b*. CLI may occur between UEs 115 within the same cell (i.e., intra-cell) (e.g., CLI 225-*a* between UE 115-*a* and UE 115-*b*) and/or between UEs 115 within different cells (i.e., inter-cell) (e.g., CLI 225-*b* between UE 115-*a* and UE 115-*c*). Inter-cell CLI may be caused by semi-static time division duplex uplink and downlink configurations in the different cells. Intra-cell CLI may be caused by specific dynamic time division duplex uplink and downlink configurations inside the same cell.

The UE 115-*a* may receive, from a base station 105-*a*, control signaling 230 scheduling a set of downlink transmissions according to a periodic scheduling configuration. Control signaling 230 may be Layer-1 signaling (e.g., DCI signaling), or Layer-3 signaling (e.g., RRC signaling), or a combination of Layer-1 signaling and Layer-3 signaling. The UE 115-*a* may also receive, from the base station 105-*a*, DCI 235 scheduling a CLI measurement in a communications resource. The UE 115 may monitor for a downlink transmission 245 of the set of downlink transmissions or perform the CLI measurement (e.g., on the uplink signal 220-*a* or the uplink signal 220-*b*) using the communications resource based on a priority scheme associated with the CLI measurement and a collision between the CLI measurement and the downlink transmission 245. The UE 115-*a* may report the result of the CLI measurement to the base station 105-*a* in a CLI measurement report 250.

In some examples, a UE 115-*a* may prioritize downlink transmissions over CLI measurements. For example, a UE 115-*a* may not monitor for or may not decode DCI 235 scheduling CLI measurements in resources that the UE 115-*a* has a scheduled downlink transmission 245. As another example, the UE 115-*a* may not expect a CLI measurement resource for aperiodic measurement that collides with a downlink transmission 245 scheduled according to a periodic scheduling configuration (e.g., a PDSCH, a PDCCH, or a CSI-RS). For example, the base station 105-*a* may avoid triggering or scheduling colliding CLI measurements and downlink transmissions 245 for the UE 115-*a*. For example, the base station 105-*a* may not trigger a CLI measurement for the UE 115-*a* if an aperiodic downlink transmission 245 is scheduled (e.g., for PDSCH) or triggered (e.g., for CSI-RS) in particular downlink resources 215 if the base station 105-*a* knows that the downlink resources 215 collide with an aperiodic transmission in uplink resources 210-*a* for another UE 115-*b* in the cell. As another example, the base station 105-*a* may not schedule or trigger any dynamic downlink transmissions for the UE 115-*a* in downlink resources 215 that collides with an uplink resources 210-*a* for another UE 115-*b* in the cell in order to avoid CLI.

In some examples, the UE 115-*a* may prioritize Layer-1 configured CLI measurements if the CLI measurement is scheduled according to a periodic scheduling configuration. For example, the base station 105-*a* and the UE 115-*a* may prioritize the periodically scheduled CLI measurement over the downlink transmission 245 similarly to the way the UE 115-*a* may prioritize Layer-3 scheduled CLI measurements over colliding downlink transmissions 245.

In some examples, the base station 105-*a* may indicate a priority level associated with the downlink transmissions 245 scheduled according to the periodic scheduling configurations (e.g., via the control signaling 230), and/or the base station 105-*a* may indicate a priority level associated with a particular CLI measurement. For example, the base station 105-*a* may indicate a priority level associated with a particular CLI measurement via the DCI 235 or via control signaling 240 (e.g., an RRC message or a MAC control element (MAC-CE) message). For example, the base station 105-*a* may add a priority level indication bit to the DCI 235 scheduling the CLI measurement. In some example, a default priority bit may be 0, indicating low priority. For example, a base station 105-*a* may indicate a higher priority level associated with a scheduled CLI measurement associated with a particular aggressor UE 115-*b* or 115-*c* (e.g., based on past behavior of the aggressor UE 115-*b* or 115-*c* or the location of the aggressor UE 115-*b* or 115-*c* in relation to the victim UE 115-*a*).

In some examples, the UE 115-*a* may prioritize particular types of downlink transmissions 245 (e.g., PDCCH or CSI-RS) over CLI measurements. For example, the DCI 235 or control signaling 240 may indicate a type of CLI measurement. In some examples, the UE 115-*a* may prioritize some types of CLI measurements over downlink transmissions 245 and the UE 115 may prioritize some types of CLI measurements below downlink transmissions 245. For example, the UE 115-*a* may prioritize SRS RSRP measurements above downlink transmissions 245 and the UE 115-*a* may prioritize CLI RSSI measurements below downlink transmissions 245. In some examples, the UE 115-*a* may identify a particular aggressor UE 115 (e.g., UE 115-*b*), for example based on an SRS-RSRP measurement. The UE 115-*a* may report the aggressor UE 115-*b* in the CLI measurement report 250.

In some examples, the base station 105-*a* may indicate (e.g., in the DCI 235 or via control signaling 240), whether the CLI measurement will be used to measure intra-cell or inter-cell CLI, and the UE 115-*a* may prioritize the CLI measurement based on the location of the UE 115-*a* within the geographic coverage area 110-*a* of the base station 105-*a* and the indication of whether the CLI measurement is for intra-cell or inter-cell CLI. For example, a UE 115-*a* on the edge of a cell may assign a higher priority to an inter-cell CLI measurement (e.g., CLI 225-*b* caused by the UE 115-*c*), while a UE 115-*a* in the center of a cell may assign a higher priority to an intra-cell CLI measurement (e.g., CLI 225-*a* caused by the UE 115-*a*). The UE 115-*a* may determine the location of the UE 115-*a* based on, for example, a mobility procedure, global positioning system signals, or other location information. The UE 115-*a* may receive downlink transmissions 245 until there is a collision with a CLI measurement with a higher priority.

Further, the priority scheme may be based on a combination of the examples described herein. For example, for a UE 115-*a* at the edge of the geographic coverage area 110-*a*, for a collision between a periodic SRS RSRP CLI measurement and a downlink transmission 245, the UE 115 may associate SRS RSRP CLI measurements associated with a UE 115-*c* with a high priority.

Figures 3A, 3B, 3C:
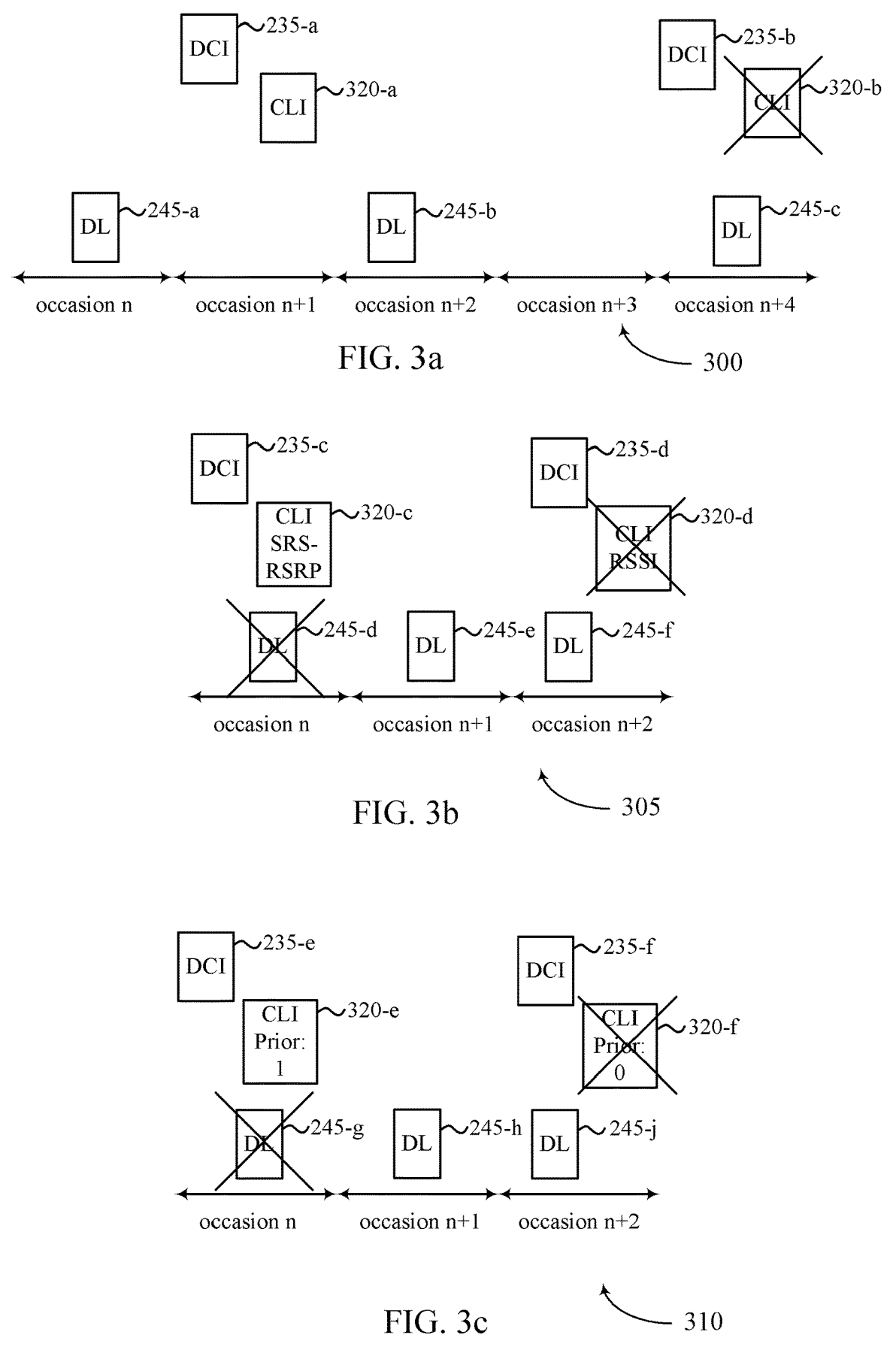

FIG. 3*a* illustrates an example of a timing diagram 300 that supports Layer-1 cross-link interference collision management in accordance with aspects of the present disclosure. The timing diagram 300 may be implemented by aspects of wireless communications systems 100 or 200. For example, the timing diagram 300 may illustrate an example of downlink transmissions between a base station 105 and a UE 115 and CLI measurements between UEs 115 as described herein.

A UE 115, may receive, from a base station 105, control signaling scheduling a set of downlink transmissions (245-*a*, 245-*b*, and 245-*c*) according to a periodic scheduling configuration. The first downlink transmission 245-*a* may occur in a first reception occasion without a collision. The UE 115 may monitor for and receive the first downlink transmission 245-*a*. In a second reception occasion, the UE 115 may receive DCI 235-*a* scheduling a CLI measurement 320-*a* in the second reception occasion. The UE 115 may perform the CLI measurement 320-*a* in the second reception occasion. The second downlink transmission 245-*b* may occur in a third reception occasion and may not collide with a CLI measurement. The UE 115 may monitor for and receive the second downlink transmission 245-*b*. In a fifth reception occasion, the UE 115 may receive DCI 235-*b* scheduling a CLI measurement 320-*b* in the fifth reception occasion and the UE 115 may also be scheduled to receive the third downlink transmission 245-*c*. As described herein, in some examples, a UE 115 may prioritize downlink transmissions over CLI measurements. Accordingly, the UE 115 may monitor for and receive the downlink transmission 245-*c* and may not perform the CLI measurement 320-*b* in the fifth reception occasion. For example, the UE 115-*a* may not monitor for or may not decode DCI 235-*c* scheduling the CLI measurement in reception occasions that the UE 115 has a scheduled downlink transmission 245-*a*, 245-*b*, or 245-*c*.

FIG. 3*b* illustrates an example of a timing diagram 305 that supports Layer-1 cross-link interference collision management in accordance with aspects of the present disclosure. The timing diagram 305 may be implemented by aspects of wireless communications systems 100 or 200. For example, the timing diagram 305 may illustrate an example of downlink transmissions between a base station 105 and a UE 115 and CLI measurements between UEs 115 as described herein.

In some examples, a UE 115 may prioritize some types of CLI measurements over downlink transmissions and the UE 115 may prioritize some types of CLI measurements below downlink transmissions. For example, very strong CLI may degrade the serving downlink transmissions received at the UE 115. If CLI measurements were to always be deprioritized, the interference from aggressor UEs 115 may not be measured and managed, and serving downlink transmission reception may not be improved. In some examples, a UE 115 may prioritize SRS RSRP measurements above downlink transmissions and the UE 115 may prioritize CLI RSSI measurements below downlink transmissions. CLI RSSI measurements may roughly estimate the interference level, and a total number of SRSs to be monitored by the UE 115 may not exceed 64. SRS RSRP measurements may accurately identify an aggressor UE to manage a particular interference source. A total number of SRSs to monitor for SRS RSRP may not exceed 32. Accordingly, monitoring SRS RSRP may advantageously enable the UE to identify a particular aggressor UE, and monitor fewer SRSs as compared to CLI RSSI.

As illustrated in FIG. 3*b*, in a first reception occasion, a UE 115 may be scheduled to receive a downlink transmission 245-*d*, and the UE 115 may also receive DCI 235-*c* scheduling a SRS RSRP CLI measurement 320-*c* that collides with the downlink transmission 245-*d*. The UE 115 may assign a higher priority to the SRS RSRP CLI measurement 320-*c* than to downlink transmissions, so the UE 115 may perform the SRS RSRP CLI measurement 320-*c* in the first reception occasion and may not monitor for or receive the downlink transmission 245-*c*. In the second reception occasion, the UE 115 may monitor for and receive a downlink transmission 245-*e* that does not collide with a CLI measurement. In the third reception occasion, the UE 115 may receive DCI 235-*d* scheduling a CLI RSSI measurement 320-*d* and the UE 115 may be scheduled to receive a downlink transmission 245-*f*. The UE 115 may monitor for and receive the downlink transmission 245-*f* and may not perform the CLI RSSI measurement 320-*d* based on the UE 115 prioritizing CLI RSSI below downlink transmissions.

FIG. 3*c* illustrates an example of a timing diagram 310 that supports Layer-1 cross-link interference collision management in accordance with aspects of the present disclosure. The timing diagram 310 may be implemented by aspects of wireless communications systems 100 or 200. For example, the timing diagram 305 may illustrate an example of downlink transmissions between a base station 105 and a UE 115 and CLI measurements between UEs 115 as described herein.

In some examples, a base station 105 may indicate a priority level associated with a particular CLI measurement. For example, the base station 105-*a* may indicate a priority level associated with a particular CLI measurement via the DCI scheduling the CLI measurement (or via control signaling configuring the CLI measurements such as an RRC message or a MAC-CE). For example, the base station 105 may add a priority level indication bit to the DCI scheduling the CLI measurement. In some example, a default priority bit may be 0, indicating low priority.

For example, in a first reception occasion, the UE 115 may receive DCI 235-*e* scheduling a CLI measurement 320-*e* that collides with the downlink transmission 245-*g*. The DCI 235-*e* may indicate that the CLI measurement 320-*e* has a priority 1 (e.g., includes a priority bit set to "1"). Accordingly, the UE 115 may perform the CLI measurement 320-*e* and may not monitor for and receive the downlink transmission 245-*g*. In the second reception occasion, the UE 115 may monitor for and receive a downlink transmission 245-*h* that does not collide with a CLI measurement. In the third reception occasion, the UE 115 may receive DCI 235-*f* scheduling a CLI measurement 320-*f* that collides with a downlink transmission 245-*j*. The DCI 235-*f* may indicate that the CLI measurement 320-*f* has a default priority (e.g., low priority indicated by a priority bit being set to "0"). Accordingly, the UE 115 may monitor for and receive the downlink transmission 245-*j* and may not perform the CLI measurement 320-*f*.

Figure 4:
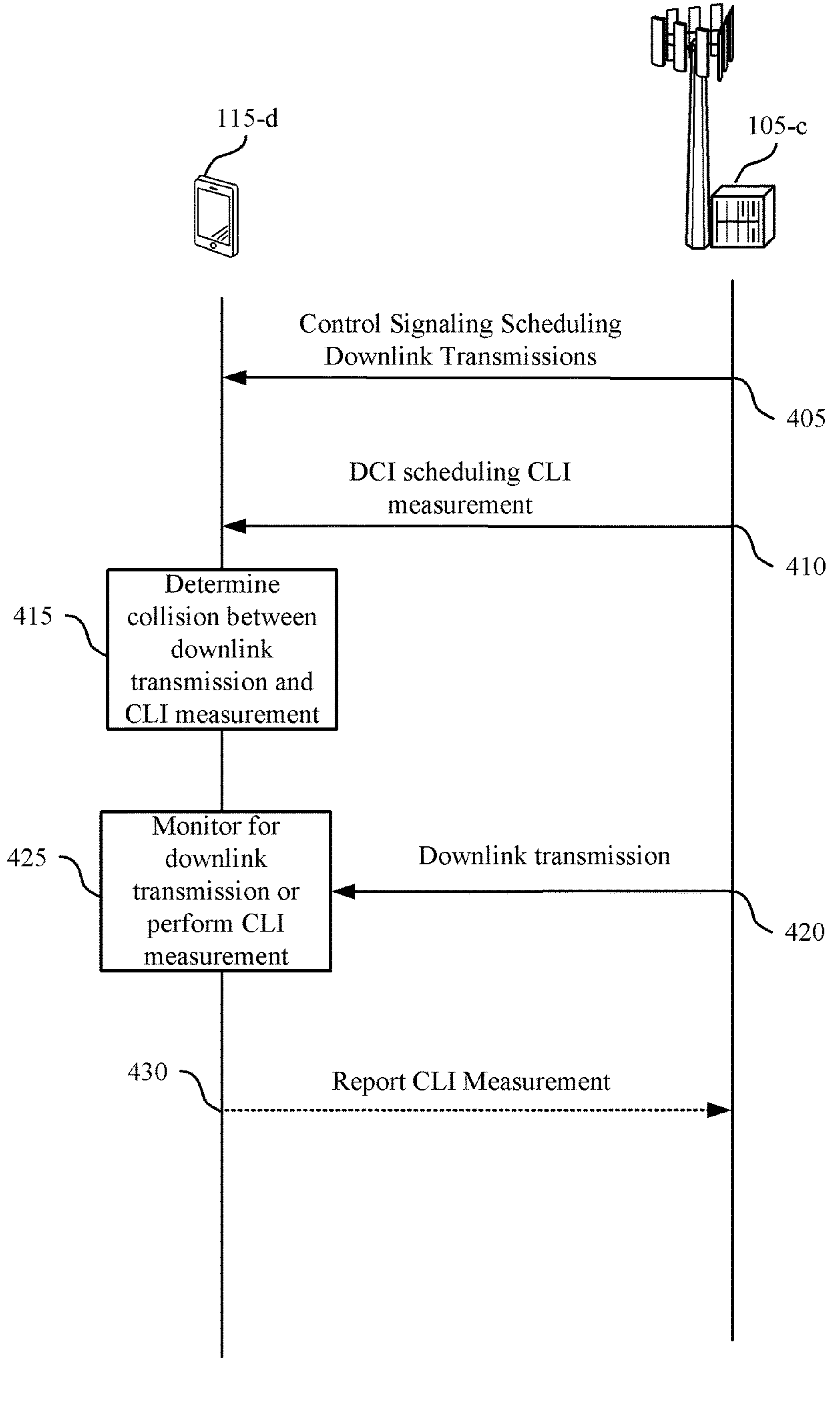
FIG. 4 illustrates an example of a process flow that supports Layer-1 cross-link interference collision management in accordance with aspects of the present disclosure.

FIG. 4 illustrates an example of a process flow 400 that supports Layer-1 cross-link interference collision management in accordance with aspects of the present disclosure. In some examples, the process flow 400 may implement aspects of wireless communications systems 100 or 200. The process flow 400 may include a UE 115-*d*, which may be an example of a UE 115 as described herein. The process flow 400 may include a base station 105-*c*, which may be an example of a base station 105 as described herein. In the following description of the process flow 400, the operations between the base station 105-*c* and the UE 115-*d* may be transmitted in a different order than the example order shown, or the operations performed by the base station 105-*c* and the UE 115-*d* may be performed in different orders or at different times. Some operations may also be omitted from the process flow 400, and other operations may be added to the process flow 400.

At 405, the UE 115-*d* may receive, from the base station 105-*c*, control signaling scheduling a set of downlink transmissions according to a periodic scheduling configuration.

At 410, the UE 115-*d* may receive, from the base station 105-*c*, DCI scheduling a cross-link interference measurement in a communications resource. At 415, the UE 115-*d* may determine that the CLI measurement collides with a downlink transmission of the set of downlink transmissions. In some examples, the UE 115-*d* may know that the DCI is associated with a communications resource that collides with a downlink transmission of the set of downlink transmissions, and the UE 115-*d* may prioritize downlink transmission over CLI measurements. Accordingly, in some examples, the UE 115-*d* may suppress decoding of the DCI based on determining that the DCI is associated with a CLI measurement that collides with a downlink transmission of the set of downlink transmissions.

At 420, the base station 105-*c* may transmit the downlink transmission of the set of downlink transmissions that collides with the scheduled CLI measurement. At 425, the UE 115-*d* either monitors for the downlink transmission transmitted at 420 or performs the CLI measurement using the communication resource based on a priority scheme associated with the CLI measurement and the collision between the downlink transmission and the communications resource.

In some examples, the UE 115-*d* may receive, from the base station 105-*c*, an indication of the priority scheme (e.g., via control signaling). In some examples, the DCI received at 410 may schedule the CLI measurement according to a periodic scheduling CLI measurement configuration, and at 425 the UE 115-*d* may monitor for the downlink transmission based on the priority scheme assigning a higher priority level to downlink transmissions than to CLI measurements scheduled in accordance with periodic scheduling CLI measurement configurations.

In some examples, the UE 115-*d* may perform the CLI measurement using the communications resource based on the CLI measurement being an aperiodic cross-link measurement and the priority scheme assigning a higher priority level to aperiodic cross-link measurements than to downlink transmissions.

In some examples, the UE 115-*d* may monitor for the downlink transmission based on the downlink transmission being a PDCCH transmission or a CSI-RS and the priority scheme assigning a higher priority to PDCCH transmissions or CSI-RSs than to CLI measurements.

In some examples, the UE 115-*d* may receive an indication, from the base station 105-*c*, (e.g., via the DCI received at 410, or via an RRC message or MAC-CE), that the CLI measurement is a SRS RSRP CLI measurement, and the UE 115-*d* may perform the SRS RSRP CLI measurement based on the priority scheme assigning a higher priority to SRS RSRP CLI measurements than to downlink transmissions. In some examples, the UE 115-*d* may identify an aggressor UE 115 based on the SRS RSRP CLI measurement.

In some examples, the UE 115-*d* may receive, from the base station 105-*c*, an indication (e.g., via the DCI received at 410, or via an RRC message or MAC-CE), that the CLI measurement is an CLI RSSI measurement, and the UE 115-*d* may monitor for the downlink transmission based on the priority scheme assigning a higher priority to downlink transmissions than to CLI RSSI measurements.

In some examples, the UE 115-*d* may receive, from the base station 105-*c*, an indication (e.g., via the DCI received at 410, or via an RRC message or MAC-CE) of a priority level associated with the CLI measurement, and the UE 115-*d* may monitor for the downlink transmission or perform the CLI measurement based on a comparison of the priority level associated with the CLI measurement to a priority level associated with the downlink transmission. In some examples, the UE 115-*d* may receive, with the control signaling received at 405, an indication of the priority level associated with the downlink transmission.

In some examples, the UE 115-*d* may receive, from the base station 105-*c*, an indication that the CLI measurement is associated with either inter-cell CLI or intra-cell CLI. The UE 115-*d* may determine a position of the UE 115-*d* within the cell associated with the base station 105-*c*, and the UE 115-*d* may monitor for the downlink transmission or perform the CLI measurement based on the indication and the position of the UE 115-*d* within the cell.

At 430, if the UE 115-*d* performed the CLI measurement, the UE 115-*d* may report the result of the CLI measurement to the base station 105-*c*. In some examples, the UE 115-*d* may also report an aggressor UE 115 to the base station 105-*c* (which may be identified, for example based on an SRS RSRP CLI measurement).

Figure 5:
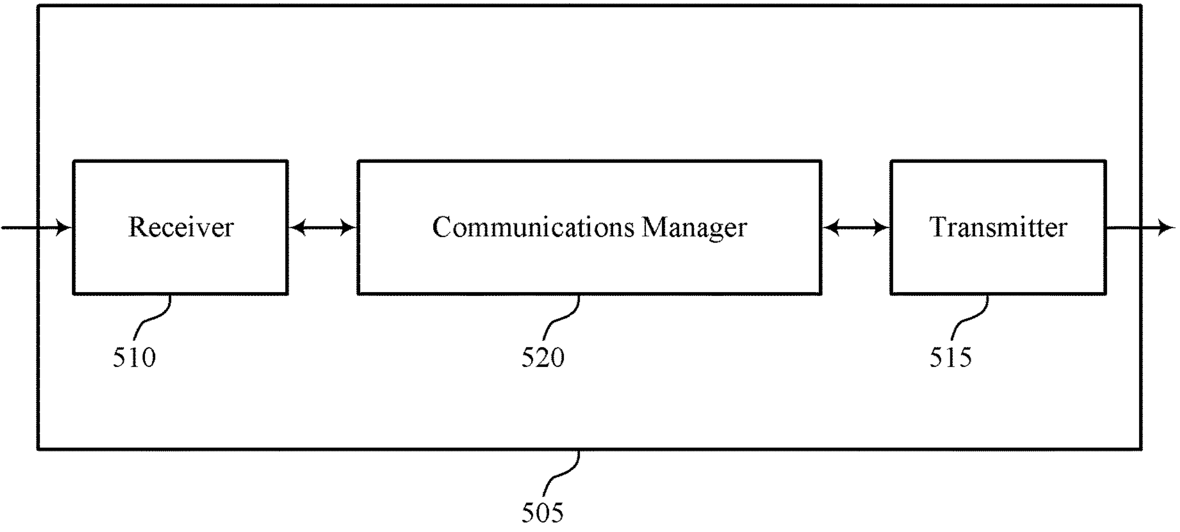
FIGS. 5 and 6 show block diagrams of devices that support Layer-1 cross-link interference collision management in accordance with aspects of the present disclosure.

FIG. 5 shows a block diagram 500 of a device 505 that supports Layer-1 cross-link interference collision management in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to Layer-1 cross-link interference collision management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to Layer-1 cross-link interference collision management). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of Layer-1 cross-link interference collision management as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, control signaling scheduling a set of downlink transmissions according to a periodic scheduling configuration. The communications manager 520 may be configured as or otherwise support a means for receiving, from the base station, DCI scheduling a cross-link interference measurement in a communications resource. The communications manager 520 may be configured as or otherwise support a means for monitoring for a downlink transmission of the set of downlink transmissions or performing the cross-link interference measurement using the communications resource based on a priority scheme associated with cross-link interference measurement and a collision between the downlink transmission and the communications resource.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources by enabling a UE to prioritize colliding CLI measurements and downlink transmissions.

Figure 6:
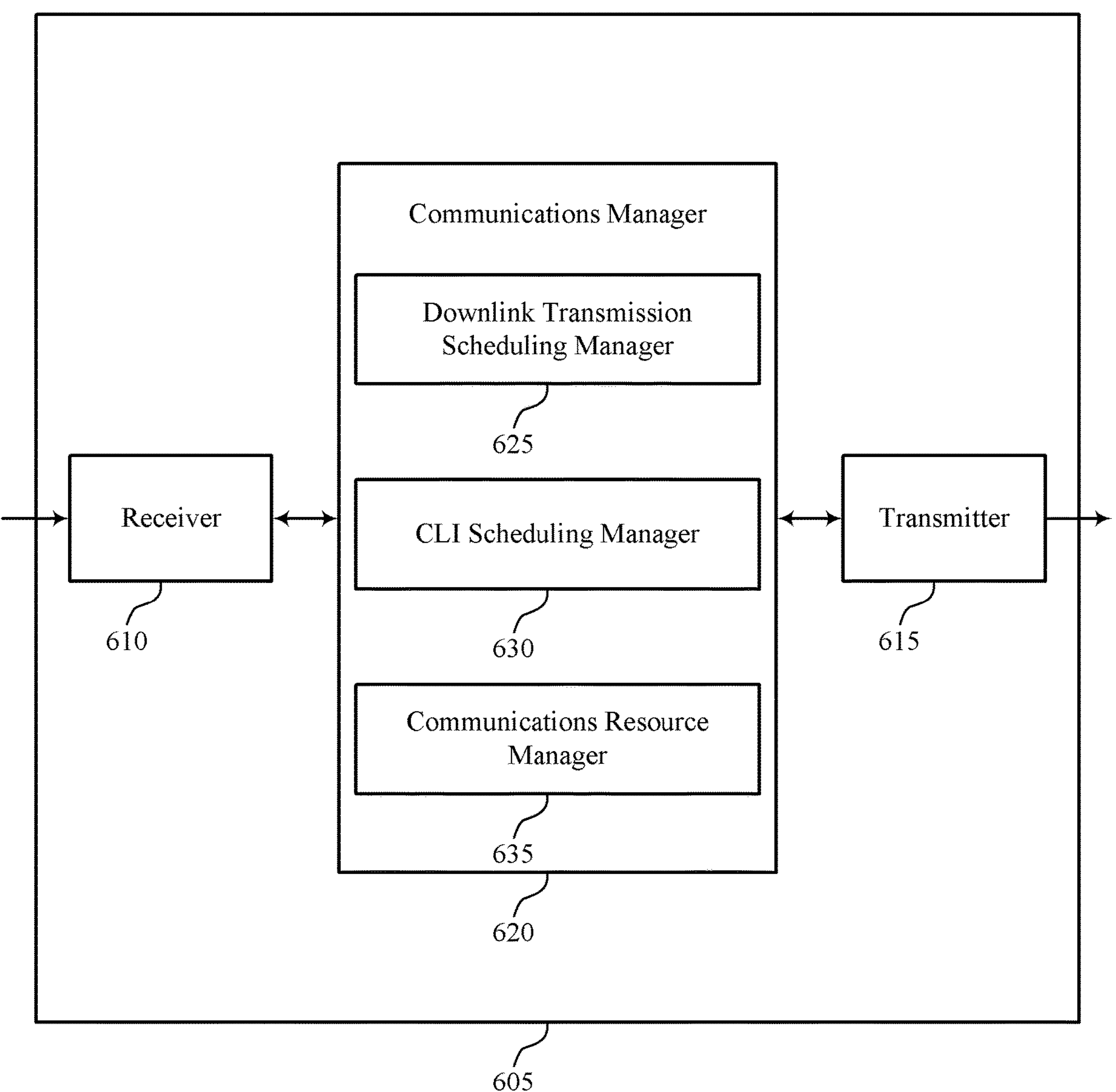

FIG. 6 shows a block diagram 600 of a device 605 that supports Layer-1 cross-link interference collision management in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to Layer-1 cross-link interference collision management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to Layer-1 cross-link interference collision management). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of Layer-1 cross-link interference collision management as described herein. For example, the communications manager 620 may include a downlink transmission scheduling manager 625, a CLI scheduling manager 630, a communications resource manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The downlink transmission scheduling manager 625 may be configured as or otherwise support a means for receiving, from a base station, control signaling scheduling a set of downlink transmissions according to a periodic scheduling configuration. The CLI scheduling manager 630 may be configured as or otherwise support a means for receiving, from the base station, DCI scheduling a cross-link interference measurement in a communications resource. The communications resource manager 635 may be configured as or otherwise support a means for monitoring for a downlink transmission of the set of downlink transmissions or performing the cross-link interference measurement using the communications resource based on a priority scheme associated with cross-link interference measurement and a collision between the downlink transmission and the communications resource.

Figure 7:
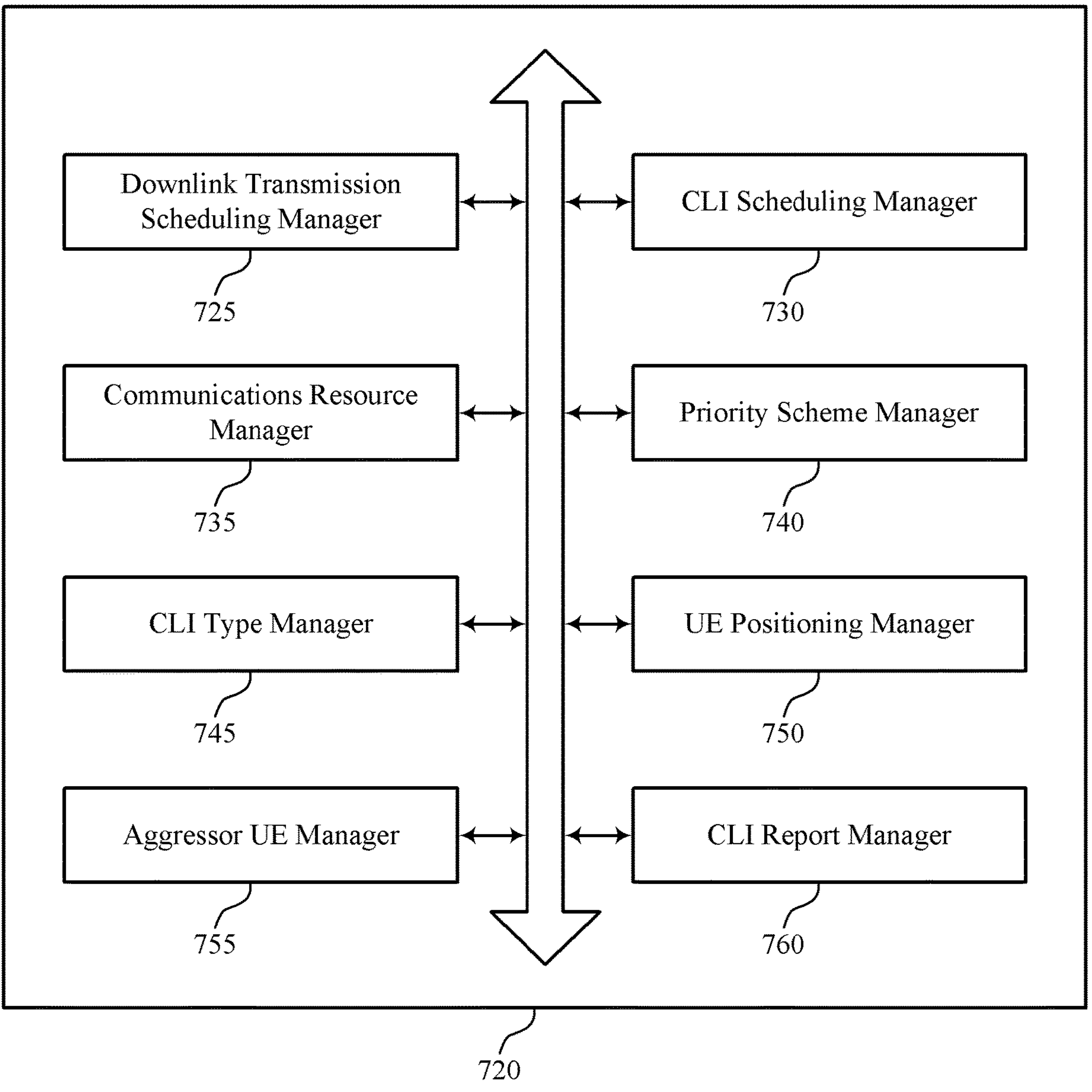
FIG. 7 shows a block diagram of a communications manager that supports Layer-1 cross-link interference collision management in accordance with aspects of the present disclosure.

FIG. 7 shows a block diagram 700 of a communications manager 720 that supports Layer-1 cross-link interference collision management in accordance with aspects of the present disclosure. The communications manager 720 may be an example of aspects of a communications manager 520, a communications manager 620, or both, as described herein. The communications manager 720, or various components thereof, may be an example of means for performing various aspects of Layer-1 cross-link interference collision management as described herein. For example, the communications manager 720 may include a downlink transmission scheduling manager 725, a CLI scheduling manager 730, a communications resource manager 735, a priority scheme manager 740, a CLI type manager 745, a UE positioning manager 750, an aggressor UE manager 755, a CLI report manager 760, or any combination thereof. Each of these components may communicate, directly or indirectly, with one another (e.g., via one or more buses).

The communications manager 720 may support wireless communications at a UE in accordance with examples as disclosed herein. The downlink transmission scheduling manager 725 may be configured as or otherwise support a means for receiving, from a base station, control signaling scheduling a set of downlink transmissions according to a periodic scheduling configuration. The CLI scheduling manager 730 may be configured as or otherwise support a means for receiving, from the base station, DCI scheduling a cross-link interference measurement in a communications resource. The communications resource manager 735 may be configured as or otherwise support a means for monitoring for a downlink transmission of the set of downlink transmissions or performing the cross-link interference measurement using the communications resource based on a priority scheme associated with cross-link interference measurement and a collision between the downlink transmission and the communications resource.

In some examples, the priority scheme manager 740 may be configured as or otherwise support a means for receiving, from the base station, an indication of the priority scheme.

In some examples, the CLI scheduling manager 730 may be configured as or otherwise support a means for receiving the DCI scheduling the cross-link interference measurement in accordance with a periodic scheduling cross-link interference measurement configuration. In some examples, the communications resource manager 735 may be configured as or otherwise support a means for monitoring for the downlink transmission using the communications resource based on the priority scheme assigning a higher priority level to downlink transmissions than to cross-link interference measurements scheduled in accordance with periodic scheduling cross-link interference measurement configurations.

In some examples, the communications resource manager 735 may be configured as or otherwise support a means for performing the cross-link interference measurement using the communications resource based on the cross-link interference measurement including an aperiodic cross-link measurement and the priority scheme assigning a higher priority level to aperiodic cross-link measurements than to downlink transmissions.

In some examples, the communications resource manager 735 may be configured as or otherwise support a means for monitoring for the downlink transmission using the communications resource based on the downlink transmission including a downlink control channel transmission and the priority scheme assigning a higher priority level to downlink control channel transmissions than to cross-link interference measurements.

In some examples, the communications resource manager 735 may be configured as or otherwise support a means for monitoring for the downlink transmission using the communications resource based on the downlink transmission including a channel state information reference signal and the priority scheme assigning a higher priority level to channel state information reference signals than to cross-link interference measurements.

In some examples, the communications resource manager 735 may be configured as or otherwise support a means for suppressing decoding of the DCI based on determining that the DCI is associated with the communications resource as the downlink transmission and based on the priority scheme assigning a higher priority level to downlink transmissions than to cross-link interference measurements.

In some examples, the CLI type manager 745 may be configured as or otherwise support a means for receiving, from the base station, an indication that the cross-link interference measurement includes a sounding reference signal reference signal received power measurement. In some examples, the communications resource manager 735 may be configured as or otherwise support a means for performing the cross-link interference measurement using the communications resource based on the priority scheme assigning a higher priority level to sounding reference signal reference signal received power measurements than to downlink transmissions.

In some examples, the aggressor UE manager 755 may be configured as or otherwise support a means for identifying an aggressor UE based on the sounding reference signal reference signal received power measurement. In some examples, the CLI report manager 760 may be configured as or otherwise support a means for reporting the cross-link interference measurement and the aggressor UE to the base station.

In some examples, the CLI type manager 745 may be configured as or otherwise support a means for receiving, from the base station, an indication that the cross-link interference measurement includes a cross-link interference received signal strength indicator measurement. In some examples, the communications resource manager 735 may be configured as or otherwise support a means for monitoring for the downlink transmission using the communications resource based on the priority scheme assigning a higher priority level to downlink transmissions than to cross-link interference received signal strength indicator measurements.

In some examples, the communications resource manager 735 may be configured as or otherwise support a means for receiving, from the base station, an indication of a first priority level associated with the cross-link interference measurement. In some examples, the communications resource manager 735 may be configured as or otherwise support a means for monitoring for the downlink transmission or performing the cross-link interference measurement using the communications resource based on a comparison of the first priority level to a second priority level associated with the downlink transmission.

In some examples, the communications resource manager 735 may be configured as or otherwise support a means for receiving, with the control signaling, an indication of the second priority level associated with the downlink transmission.

In some examples, the communications resource manager 735 may be configured as or otherwise support a means for receiving the indication of the first priority level associated with the cross-link interference measurement via one of the DCI, an RRC message, or a MAC-control element.

In some examples, the CLI scheduling manager 730 may be configured as or otherwise support a means for receiving, from the base station, an indication that the cross-link interference measurement is associated with either inter-cell or intra-cell cross-link interference. In some examples, the UE positioning manager 750 may be configured as or otherwise support a means for determining a position of the UE within a cell associated with the base station. In some examples, the communications resource manager 735 may be configured as or otherwise support a means for monitoring for the downlink transmission or performing the cross-link interference measurement based on the indication and the determined position of the UE within the cell.

In some examples, the communications resource manager 735 may be configured as or otherwise support a means for receiving the indication that the cross-link interference measurement is associated with either inter-cell or intra-cell cross-link interference via one of the DCI, an RRC message, or a MAC-CE.

Figure 8:
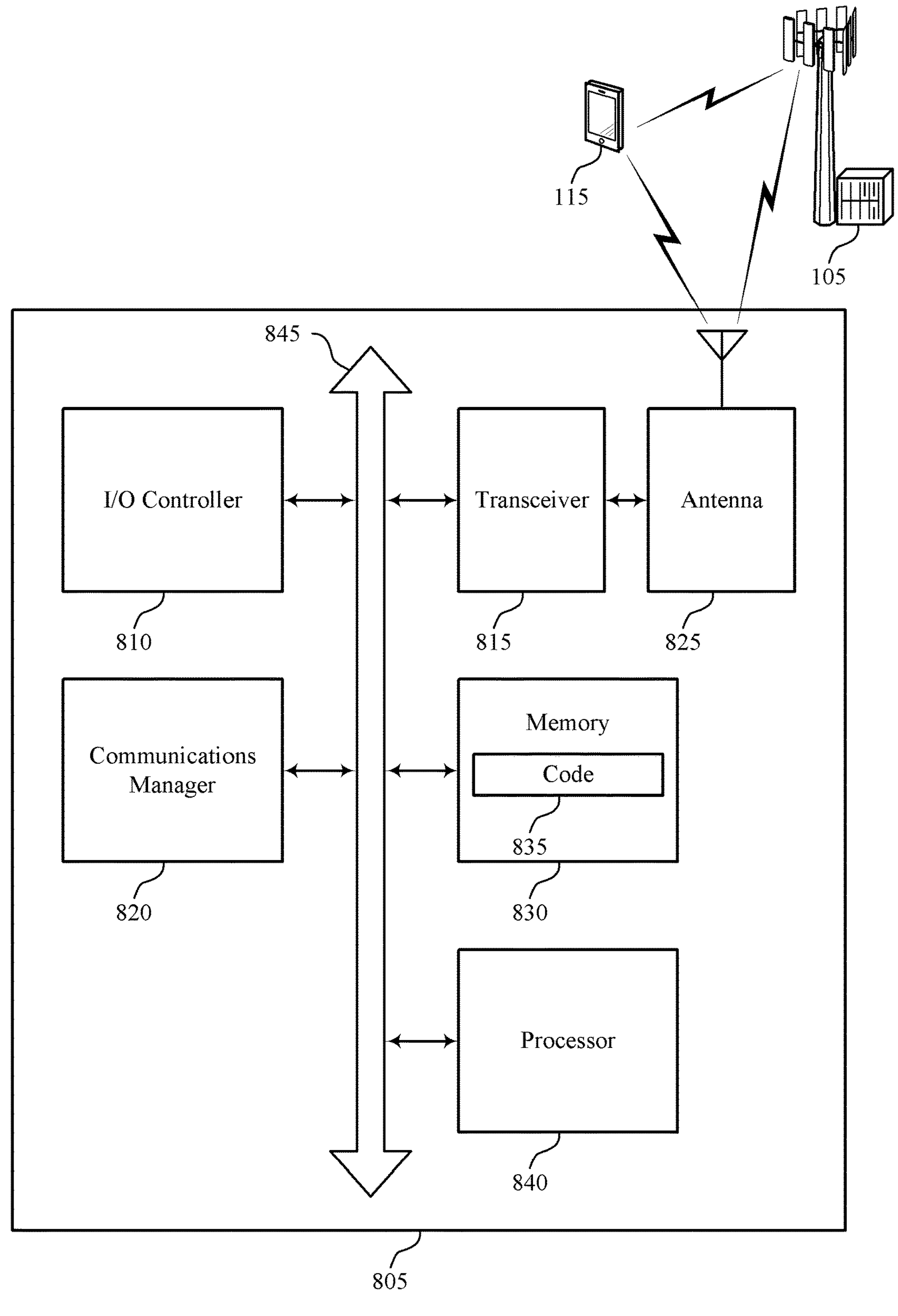
FIG. 8 shows a diagram of a system including a device that supports Layer-1 cross-link interference collision management in accordance with aspects of the present disclosure.

FIG. 8 shows a diagram of a system 800 including a device 805 that supports Layer-1 cross-link interference collision management in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting Layer-1 cross-link interference collision management). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, control signaling scheduling a set of downlink transmissions according to a periodic scheduling configuration. The communications manager 820 may be configured as or otherwise support a means for receiving, from the base station, DCI scheduling a cross-link interference measurement in a communications resource. The communications manager 820 may be configured as or otherwise support a means for monitoring for a downlink transmission of the set of downlink transmissions or performing the cross-link interference measurement using the communications resource based on a priority scheme associated with cross-link interference measurement and a collision between the downlink transmission and the communications resource.

By including or configuring the communications manager 820 in accordance with examples as described herein, the device 805 may support techniques for improved communication reliability and more efficient utilization of communication resources by enabling a UE to prioritize colliding CLI measurements and downlink transmissions.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of Layer-1 cross-link interference collision management as described herein, or the processor 840 and the memory 830 may be otherwise configured to perform or support such operations.

Figure 9:
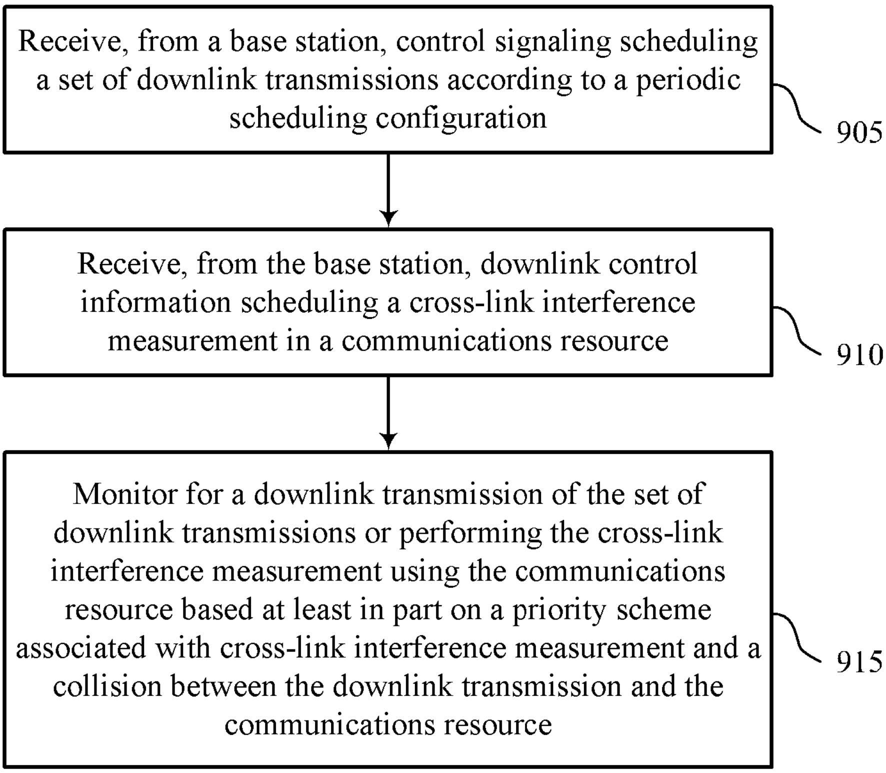
FIGS. 9 through 12 show flowcharts illustrating methods that support Layer-1 cross-link interference collision management in accordance with aspects of the present disclosure.

FIG. 9 shows a flowchart illustrating a method 900 that supports Layer-1 cross-link interference collision management in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station, control signaling scheduling a set of downlink transmissions according to a periodic scheduling configuration. The operations of 905 may be performed in accordance with examples as disclosed herein. In some examples, aspects of the operations of 905 may be performed by a downlink transmission scheduling manager 725 as described with reference to FIG. 7.

At 910, the method may include receiving, from the base station, DCI scheduling a cross-link interference measurement in a communications resource. The operations of 910 may be performed in accordance with examples as disclosed herein. In some examples, aspects of the operations of 910 may be performed by a CLI scheduling manager 730 as described with reference to FIG. 7.

At 915, the method may include monitoring for a downlink transmission of the set of downlink transmissions or performing the cross-link interference measurement using the communications resource based on a priority scheme associated with cross-link interference measurement and a collision between the downlink transmission and the communications resource. The operations of 915 may be performed in accordance with examples as disclosed herein. In some examples, aspects of the operations of 915 may be performed by a communications resource manager 735 as described with reference to FIG. 7.

Figure 10:
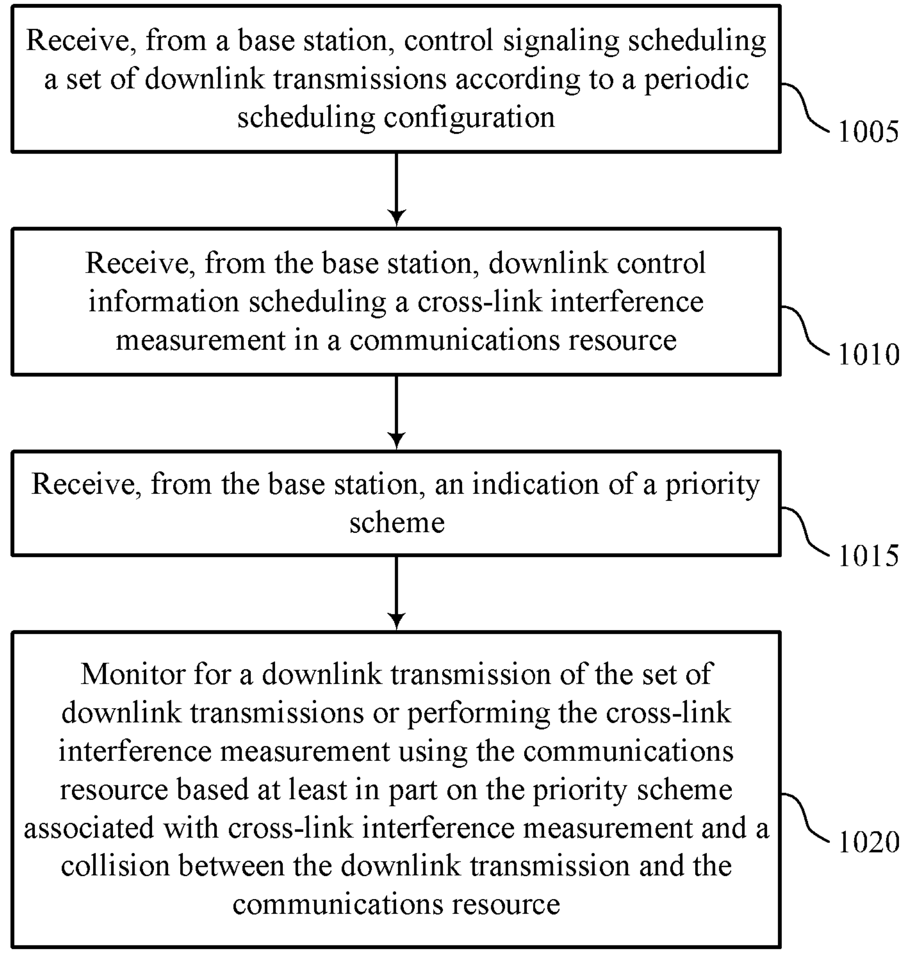

FIG. 10 shows a flowchart illustrating a method 1000 that supports Layer-1 cross-link interference collision management in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, control signaling scheduling a set of downlink transmissions according to a periodic scheduling configuration. The operations of 1005 may be performed in accordance with examples as disclosed herein. In some examples, aspects of the operations of 1005 may be performed by a downlink transmission scheduling manager 725 as described with reference to FIG. 7.

At 1010, the method may include receiving, from the base station, DCI scheduling a cross-link interference measurement in a communications resource. The operations of 1010 may be performed in accordance with examples as disclosed herein. In some examples, aspects of the operations of 1010 may be performed by a CLI scheduling manager 730 as described with reference to FIG. 7.

At 1015, the method may include receiving, from the base station, an indication of a priority scheme. The operations of 1015 may be performed in accordance with examples as disclosed herein. In some examples, aspects of the operations of 1015 may be performed by a priority scheme manager 740 as described with reference to FIG. 7.

At 1020, the method may include monitoring for a downlink transmission of the set of downlink transmissions or performing the cross-link interference measurement using the communications resource based on the priority scheme associated with cross-link interference measurement and a collision between the downlink transmission and the communications resource. The operations of 1020 may be performed in accordance with examples as disclosed herein. In some examples, aspects of the operations of 1020 may be performed by a communications resource manager 735 as described with reference to FIG. 7.

Figure 11:
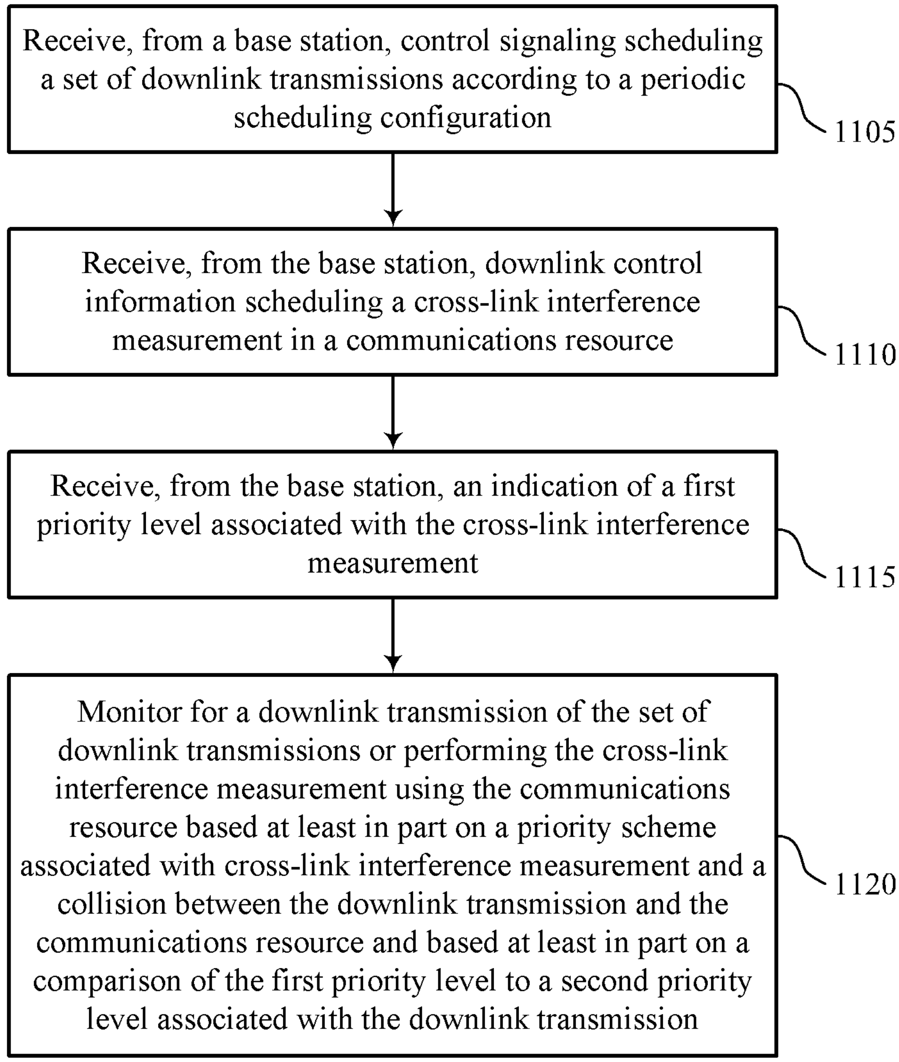

FIG. 11 shows a flowchart illustrating a method 1100 that supports Layer-1 cross-link interference collision management in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, control signaling scheduling a set of downlink transmissions according to a periodic scheduling configuration. The operations of 1105 may be performed in accordance with examples as disclosed herein. In some examples, aspects of the operations of 1105 may be performed by a downlink transmission scheduling manager 725 as described with reference to FIG. 7.

At 1110, the method may include receiving, from the base station, DCI scheduling a cross-link interference measurement in a communications resource. The operations of 1110 may be performed in accordance with examples as disclosed herein. In some examples, aspects of the operations of 1110 may be performed by a CLI scheduling manager 730 as described with reference to FIG. 7.

At 1115, the method may include receiving, from the base station, an indication of a first priority level associated with the cross-link interference measurement. The operations of 1115 may be performed in accordance with examples as disclosed herein. In some examples, aspects of the operations of 1115 may be performed by a communications resource manager 735 as described with reference to FIG. 7.

At 1120, the method may include monitoring for a downlink transmission of the set of downlink transmissions or performing the cross-link interference measurement using the communications resource based on a priority scheme associated with cross-link interference measurement and a collision between the downlink transmission and the communications resource and based on a comparison of the first priority level to a second priority level associated with the downlink transmission. The operations of 1120 may be performed in accordance with examples as disclosed herein. In some examples, aspects of the operations of 1120 may be performed by a communications resource manager 735 as described with reference to FIG. 7.

Figure 12:
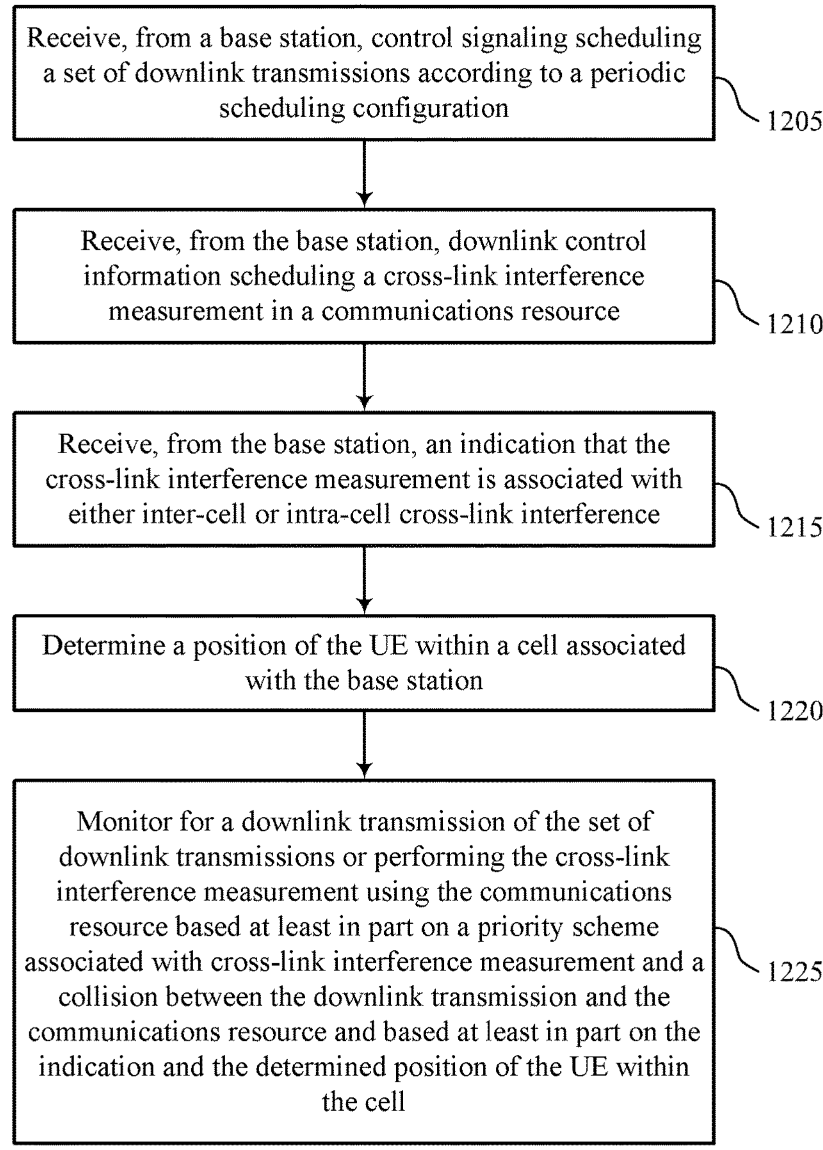

FIG. 12 shows a flowchart illustrating a method 1200 that supports Layer-1 cross-link interference collision management in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, control signaling scheduling a set of downlink transmissions according to a periodic scheduling configuration. The operations of 1205 may be performed in accordance with examples as disclosed herein. In some examples, aspects of the operations of 1205 may be performed by a downlink transmission scheduling manager 725 as described with reference to FIG. 7.

At 1210, the method may include receiving, from the base station, DCI scheduling a cross-link interference measurement in a communications resource. The operations of 1210 may be performed in accordance with examples as disclosed herein. In some examples, aspects of the operations of 1210 may be performed by a CLI scheduling manager 730 as described with reference to FIG. 7.

At 1215, the method may include receiving, from the base station, an indication that the cross-link interference measurement is associated with either inter-cell or intra-cell cross-link interference. The operations of 1215 may be performed in accordance with examples as disclosed herein. In some examples, aspects of the operations of 1215 may be performed by a CLI scheduling manager 730 as described with reference to FIG. 7.

At 1220, the method may include determining a position of the UE within a cell associated with the base station. The operations of 1220 may be performed in accordance with examples as disclosed herein. In some examples, aspects of the operations of 1220 may be performed by a UE positioning manager 750 as described with reference to FIG. 7.

At 1225, the method may include monitoring for a downlink transmission of the set of downlink transmissions or performing the cross-link interference measurement using the communications resource based on a priority scheme associated with cross-link interference measurement and a collision between the downlink transmission and the communications resource and based on the indication and the determined position of the UE within the cell. The operations of 1225 may be performed in accordance with examples as disclosed herein. In some examples, aspects of the operations of 1225 may be performed by a communications resource manager 735 as described with reference to FIG. 7.

The following provides an overview of aspects of the present disclosure:

Aspect 1: A method for wireless communications at a UE, comprising: receiving, from a base station, control signaling scheduling a set of downlink transmissions according to a periodic scheduling configuration; receiving, from the base station, downlink control information scheduling a cross-link interference measurement in a communications resource; and monitoring for a downlink transmission of the set of downlink transmissions or performing the cross-link interference measurement using the communications resource based at least in part on a priority scheme associated with cross-link interference measurement and a collision between the downlink transmission and the communications resource.

Aspect 2: The method of aspect 1, further comprising: receiving, from the base station, an indication of the priority scheme.

Aspect 3: The method of any of aspects 1 through 2, further comprising: receiving the downlink control information scheduling the cross-link interference measurement in accordance with a periodic scheduling cross-link interference measurement configuration; and monitoring for the downlink transmission using the communications resource based at least in part on the priority scheme assigning a higher priority level to downlink transmissions than to cross-link interference measurements scheduled in accordance with periodic scheduling cross-link interference measurement configurations.

Aspect 4: The method of any of aspects 1 through 3, further comprising: performing the cross-link interference measurement using the communications resource based at least in part on the cross-link interference measurement comprising an aperiodic cross-link measurement and the priority scheme assigning a higher priority level to aperiodic cross-link measurements than to downlink transmissions.

Aspect 5: The method of any of aspects 1 through 4, further comprising: monitoring for the downlink transmission using the communications resource based at least in part on the downlink transmission comprising a downlink control channel transmission and the priority scheme assigning a higher priority level to downlink control channel transmissions than to cross-link interference measurements.

Aspect 6: The method of any of aspects 1 through 5, further comprising: monitoring for the downlink transmission using the communications resource based at least in part on the downlink transmission comprising a channel state information reference signal and the priority scheme assigning a higher priority level to channel state information reference signals than to cross-link interference measurements.

Aspect 7: The method of any of aspects 1 through 6, further comprising: suppressing decoding of the downlink control information based at least in part on determining that the downlink control information is associated with the communications resource as the downlink transmission and based at least in part on the priority scheme assigning a higher priority level to downlink transmissions than to cross-link interference measurements.

Aspect 8: The method of any of aspects 1 through 7, further comprising: receiving, from the base station, an indication that the cross-link interference measurement comprises a sounding reference signal reference signal received power measurement; and performing the cross-link interference measurement using the communications resource based at least in part on the priority scheme assigning a higher priority level to sounding reference signal reference signal received power measurements than to downlink transmissions.

Aspect 9: The method of aspect 8, further comprising: identifying an aggressor UE based at least in part on the sounding reference signal reference signal received power measurement; and reporting the cross-link interference measurement and the aggressor UE to the base station.

Aspect 10: The method of any of aspects 1 through 9, further comprising: receiving, from the base station, an indication that the cross-link interference measurement comprises a cross-link interference received signal strength indicator measurement; and monitoring for the downlink transmission using the communications resource based at least in part on the priority scheme assigning a higher priority level to downlink transmissions than to cross-link interference received signal strength indicator measurements.

Aspect 11: The method of any of aspects 1 through 10, further comprising: receiving, from the base station, an indication of a first priority level associated with the cross-link interference measurement; and monitoring for the downlink transmission or performing the cross-link interference measurement using the communications resource based at least in part on a comparison of the first priority level to a second priority level associated with the downlink transmission.

Aspect 12: The method of aspect 11, further comprising: receiving, with the control signaling, an indication of the second priority level associated with the downlink transmission.

Aspect 13: The method of any of aspects 11 through 12, further comprising: receiving the indication of the first priority level associated with the cross-link interference measurement via one of the downlink control information, a radio resource control message, or a medium access control (MAC) control element.

Aspect 14: The method of any of aspects 1 through 13, further comprising: receiving, from the base station, an indication that the cross-link interference measurement is associated with either inter-cell or intra-cell cross-link interference; determining a position of the UE within a cell associated with the base station; and monitoring for the downlink transmission or performing the cross-link interference measurement based at least in part on the indication and the determined position of the UE within the cell.

Aspect 15: The method of aspect 14, further comprising: receiving the indication that the cross-link interference measurement is associated with either inter-cell or intra-cell cross-link interference via one of the downlink control information, a radio resource control message, or a medium access control (MAC) control element.

Aspect 16: An apparatus for wireless communications at a UE, comprising a processor; memory coupled with the processor; and instructions stored in the memory and executable by the processor to cause the apparatus to perform a method of any of aspects 1 through 15.

Aspect 17: An apparatus for wireless communications at a UE, comprising at least one means for performing a method of any of aspects 1 through 15.

Aspect 18: A non-transitory computer-readable medium storing code for wireless communications at a UE, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a base station, control signaling scheduling a set of downlink transmissions according to a periodic scheduling configuration;

receiving, from the base station, downlink control information scheduling a cross-link interference measurement in a communications resource; and monitoring for a downlink transmission of the set of downlink transmissions or performing the cross-link interference measurement using the communications resource based at least in part on a priority scheme associated with cross-link interference measurement and a collision between the downlink transmission and the communications resource.

2. The method of claim 1, further comprising:

receiving, from the base station, an indication of the priority scheme.

3. The method of claim 1, further comprising:

receiving the downlink control information scheduling the cross-link interference measurement in accordance with a periodic scheduling cross-link interference measurement configuration; and monitoring for the downlink transmission using the communications resource based at least in part on the priority scheme assigning a higher priority level to downlink transmissions than to cross-link interference measurements scheduled in accordance with periodic scheduling cross-link interference measurement configurations.

4. The method of claim 1, further comprising:

performing the cross-link interference measurement using the communications resource based at least in part on the cross-link interference measurement comprising an aperiodic cross-link measurement and the priority scheme assigning a higher priority level to aperiodic cross-link measurements than to downlink transmissions.

5. The method of claim 1, further comprising:

monitoring for the downlink transmission using the communications resource based at least in part on the downlink transmission comprising a downlink control channel transmission and the priority scheme assigning a higher priority level to downlink control channel transmissions than to cross-link interference measurements.

6. The method of claim 1, further comprising:

monitoring for the downlink transmission using the communications resource based at least in part on the downlink transmission comprising a channel state information reference signal and the priority scheme assigning a higher priority level to channel state information reference signals than to cross-link interference measurements.

7. The method of claim 1, further comprising:

suppressing decoding of the downlink control information based at least in part on determining that the downlink control information is associated with the communications resource as the downlink transmission and based at least in part on the priority scheme assigning a higher priority level to downlink transmissions than to cross-link interference measurements.

8. The method of claim 1, further comprising:

receiving, from the base station, an indication that the cross-link interference measurement comprises a sounding reference signal reference signal received power measurement; and performing the cross-link interference measurement using the communications resource based at least in part on the priority scheme assigning a higher priority level to sounding reference signal reference signal received power measurements than to downlink transmissions.

9. The method of claim 8, further comprising:

identifying an aggressor UE based at least in part on the sounding reference signal reference signal received power measurement; and reporting the cross-link interference measurement and the aggressor UE to the base station.

10. The method of claim 1, further comprising:

receiving, from the base station, an indication that the cross-link interference measurement comprises a cross-link interference received signal strength indicator measurement; and monitoring for the downlink transmission using the communications resource based at least in part on the priority scheme assigning a higher priority level to downlink transmissions than to cross-link interference received signal strength indicator measurements.

11. The method of claim 1, further comprising:

receiving, from the base station, an indication of a first priority level associated with the cross-link interference measurement; and monitoring for the downlink transmission or performing the cross-link interference measurement using the communications resource based at least in part on a comparison of the first priority level to a second priority level associated with the downlink transmission.

12. The method of claim 11, further comprising:

receiving, with the control signaling, an indication of the second priority level associated with the downlink transmission.

13. The method of claim 11, further comprising:

receiving the indication of the first priority level associated with the cross-link interference measurement via one of the downlink control information, a radio resource control message, or a medium access control (MAC) control element.

14. The method of claim 1, further comprising:

receiving, from the base station, an indication that the cross-link interference measurement is associated with either inter-cell or intra-cell cross-link interference;

determining a position of the UE within a cell associated with the base station; and monitoring for the downlink transmission or performing the cross-link interference measurement based at least in part on the indication and the determined position of the UE within the cell.

15. The method of claim 14, further comprising:

receiving the indication that the cross-link interference measurement is associated with either inter-cell or intra-cell cross-link interference via one of the downlink control information, a radio resource control message, or a medium access control (MAC) control element.

16. An apparatus for wireless communications at a user equipment (UE), comprising:

a processor;

memory coupled with the processor; and instructions stored in the memory and executable by the processor to cause the apparatus to:

receive, from a base station, control signaling scheduling a set of downlink transmissions according to a periodic scheduling configuration;

receive, from the base station, downlink control information scheduling a cross-link interference measurement in a communications resource; and monitor for a downlink transmission of the set of downlink transmissions or performing the cross-link interference measurement using the communications resource based at least in part on a priority scheme associated with cross-link interference measurement and a collision between the downlink transmission and the communications resource.

17. The apparatus of claim 16, wherein the instructions are further executable by the processor to cause the apparatus to:

receive, from the base station, an indication of the priority scheme.

18. The apparatus of claim 16, wherein the instructions are further executable by the processor to cause the apparatus to:

receive the downlink control information scheduling the cross-link interference measurement in accordance with a periodic scheduling cross-link interference measurement configuration; and monitor for the downlink transmission using the communications resource based at least in part on the priority scheme assigning a higher priority level to downlink transmissions than to cross-link interference measurements scheduled in accordance with periodic scheduling cross-link interference measurement configurations.

19. The apparatus of claim 16, wherein the instructions are further executable by the processor to cause the apparatus to:

perform the cross-link interference measurement using the communications resource based at least in part on the cross-link interference measurement comprising an aperiodic cross-link measurement and the priority scheme assigning a higher priority level to aperiodic cross-link measurements than to downlink transmissions.

20. The apparatus of claim 16, wherein the instructions are further executable by the processor to cause the apparatus to:

monitor for the downlink transmission using the communications resource based at least in part on the downlink transmission comprising a downlink control channel transmission and the priority scheme assigning a higher priority level to downlink control channel transmissions than to cross-link interference measurements.

21. The apparatus of claim 16, wherein the instructions are further executable by the processor to cause the apparatus to:

monitor for the downlink transmission using the communications resource based at least in part on the downlink transmission comprising a channel state information reference signal and the priority scheme assigning a higher priority level to channel state information reference signals than to cross-link interference measurements.

22. The apparatus of claim 16, wherein the instructions are further executable by the processor to cause the apparatus to:

suppress decoding of the downlink control information based at least in part on determining that the downlink control information is associated with the communications resource as the downlink transmission and based at least in part on the priority scheme assigning a higher priority level to downlink transmissions than to cross-link interference measurements.

23. The apparatus of claim 16, wherein the instructions are further executable by the processor to cause the apparatus to:

receive, from the base station, an indication that the cross-link interference measurement comprises a sounding reference signal reference signal received power measurement; and perform the cross-link interference measurement using the communications resource based at least in part on the priority scheme assigning a higher priority level to sounding reference signal reference signal received power measurements than to downlink transmissions.

24. The apparatus of claim 23, wherein the instructions are further executable by the processor to cause the apparatus to:

identify an aggressor UE based at least in part on the sounding reference signal reference signal received power measurement; and report the cross-link interference measurement and the aggressor UE to the base station.

25. The apparatus of claim 16, wherein the instructions are further executable by the processor to cause the apparatus to:

receive, from the base station, an indication that the cross-link interference measurement comprises a cross-link interference received signal strength indicator measurement; and monitor for the downlink transmission using the communications resource based at least in part on the priority scheme assigning a higher priority level to downlink transmissions than to cross-link interference received signal strength indicator measurements.

26. The apparatus of claim 16, wherein the instructions are further executable by the processor to cause the apparatus to:

receive, from the base station, an indication of a first priority level associated with the cross-link interference measurement; and monitor for the downlink transmission or performing the cross-link interference measurement using the communications resource based at least in part on a comparison of the first priority level to a second priority level associated with the downlink transmission.

27. The apparatus of claim 26, wherein the instructions are further executable by the processor to cause the apparatus to:

receive, with the control signaling, an indication of the second priority level associated with the downlink transmission.

28. The apparatus of claim 26, wherein the instructions are further executable by the processor to cause the apparatus to:

receive the indication of the first priority level associated with the cross-link interference measurement via one of the downlink control information, a radio resource control message, or a medium access control (MAC) control element.

29. An apparatus for wireless communications at a user equipment (UE), comprising:

means for receiving, from a base station, control signaling scheduling a set of downlink transmissions according to a periodic scheduling configuration;

means for receiving, from the base station, downlink control information scheduling a cross-link interference measurement in a communications resource; and means for monitoring for a downlink transmission of the set of downlink transmissions or performing the cross-link interference measurement using the communications resource based at least in part on a priority scheme associated with cross-link interference measurement and a collision between the downlink transmission and the communications resource.

30. A non-transitory computer-readable medium storing code for wireless communications at a user equipment (UE), the code comprising instructions executable by a processor to:

receive, from a base station, control signaling scheduling a set of downlink transmissions according to a periodic scheduling configuration;

receive, from the base station, downlink control information scheduling a cross-link interference measurement in a communications resource; and monitor for a downlink transmission of the set of downlink transmissions or performing the cross-link interference measurement using the communications resource based at least in part on a priority scheme associated with cross-link interference measurement and a collision between the downlink transmission and the communications resource.

* * * * *